US012682185B1

(12) United States Patent
Samuel et al.

(10) Patent No.: US 12,682,185 B1
(45) Date of Patent: Jul. 14, 2026

(54) ADVANCED LANGUAGE MODEL FOR DYNAMIC ENTITY MATCHING

(71) Applicant: Intuit Inc., Mountain View, CA (US)

(72) Inventors: John Samuel, Bangalore (IN); Murari Lal, Bangalore (IN); Vishal Kumar Singh, Bangalore (IN); Sanjay Kumar, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/307,982

(22) Filed: Aug. 22, 2025

(51) Int. Cl.
G06F 40/40 (2020.01)
G06F 16/9535 (2019.01)

(52) U.S. Cl.
CPC .......... G06F 40/40 (2020.01); G06F 16/9535 (2019.01)

(58) Field of Classification Search
CPC .......... G06F 40/40; G06F 40/30; G06F 40/20
See application file for complete search history.

(56) References Cited

U.S. PATENT DOCUMENTS 8,788,286 B2 * 7/2014 Kenedy ................. G16H 50/20
705/2
2019/0385125 A1 * 12/2019 Blakely ............. G06Q 10/1053

2023/0342558 A1 * 10/2023 Wang .................... G06F 40/295
2024/0354153 A1 * 10/2024 Jonnalagadda ....... G06F 9/4881
2025/0008184 A1 * 1/2025 Liu ....................... G11B 27/031

OTHER PUBLICATIONS

Yue et al., "Automatic Evaluation of Attribution by Large Language Models", EMNLP 2023 Findings, Oct. 7, 2023, 21 Pages, arXiv:2305.06311v2 [cs.CL].
Asai et al., "Self-RAG: Learning to Retrieve, Generate, and Critique through Self-Reflection", International Conference on Learning Representations, Oct. 17, 2023, 30 Pages, arXiv:2310.11511v1 [cs.CL].

* cited by examiner

*Primary Examiner* — Daniel C Washburn
*Assistant Examiner* — Paul J. Mueller
(74) *Attorney, Agent, or Firm* — Dinsmore & Shohl LLP

(57) ABSTRACT

Aspects of the disclosure provide a method for profile matching including receiving a first user input comprising one or more assistant attributes; generating an assistant profile; matching the assistant profile to a target user profile and a task; receiving interaction data between the assistant user and a target user; receiving a second user input comprising feedback about the assistant user completing the task; generating a prompt comprising a set of instructions for a language model to generate a feature set associated with the assistant user; providing the prompt, the first user input, the interaction data, and the second user input to the language model; receiving the feature set associated with the assistant user from the language model; generating an updated assistant profile; and matching the updated assistant profile with a new target user profile associated with a new target user and a new task.

20 Claims, 9 Drawing Sheets

800

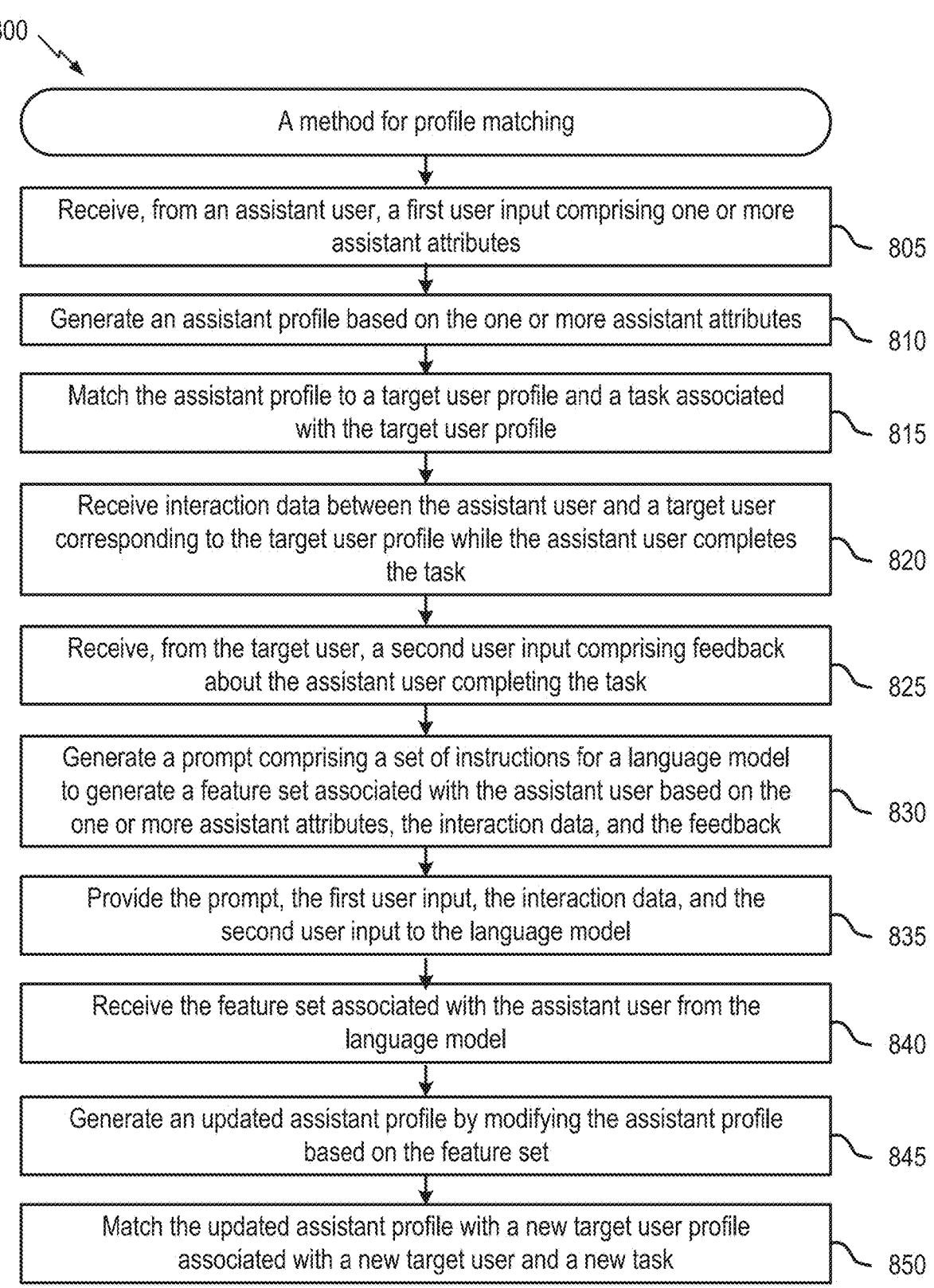

A method for profile matching

Receive, from an assistant user, a first user input comprising one or more assistant attributes — 805

Generate an assistant profile based on the one or more assistant attributes — 810

Match the assistant profile to a target user profile and a task associated with the target user profile — 815

Receive interaction data between the assistant user and a target user corresponding to the target user profile while the assistant user completes the task — 820

Receive, from the target user, a second user input comprising feedback about the assistant user completing the task — 825

Generate a prompt comprising a set of instructions for a language model to generate a feature set associated with the assistant user based on the one or more assistant attributes, the interaction data, and the feedback — 830

Provide the prompt, the first user input, the interaction data, and the second user input to the language model — 835

Receive the feature set associated with the assistant user from the language model — 840

Generate an updated assistant profile by modifying the assistant profile based on the feature set — 845

Match the updated assistant profile with a new target user profile associated with a new target user and a new task — 850

*FIG.8*

ADVANCED LANGUAGE MODEL FOR DYNAMIC ENTITY MATCHING

BACKGROUND

Field

Aspects of the present disclosure relate to machine-learning based entity matching systems.

Description of Related Art

Entity matching systems have become fundamental components of modern digital platforms, servicing various technological domains, such as online marketplaces, professional networking platforms, ride-sharing services, dating applications, job placement systems, and collaborative platforms. These systems are designed to identify and pair entities belonging to different classifications based on different criteria. For example, in a ride-sharing platform, the system is configured to match drivers with passengers. In professional networking environments, the entity matching systems are configured to match job seekers with potential employers. In service provider platforms, the entity matching systems are configured to match service providers with users needing specific services. Given their widespread application across diverse technological domains, entity matching systems represent an important infrastructure component that user resource allocation and relationship formation in modern digital ecosystems.

SUMMARY

Certain aspects provide a method that includes receiving, from an assistant user, a first user input comprising one or more assistant attributes; generating an assistant profile based on the one or more assistant attributes; matching the assistant profile to a target user profile and a task associated with the target user profile; receiving interaction data between the assistant user and a target user corresponding to the target user profile while the assistant user completes the task; receiving, from the target user, a second user input comprising feedback about the assistant user completing the task; generating a prompt comprising a set of instructions for a language model to generate a feature set associated with the assistant user based on the one or more assistant attributes, the interaction data, and the feedback; providing the prompt, the first user input, the interaction data, and the second user input to the language model; receiving the feature set associated with the assistant user from the language model; generating an updated assistant profile by modifying the assistant profile based on the feature set; and matching the updated assistant profile with a new target user profile associated with a new target user and a new task.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 8 depicts a flowchart associated with a method for matching assistant profiles to user profiles.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
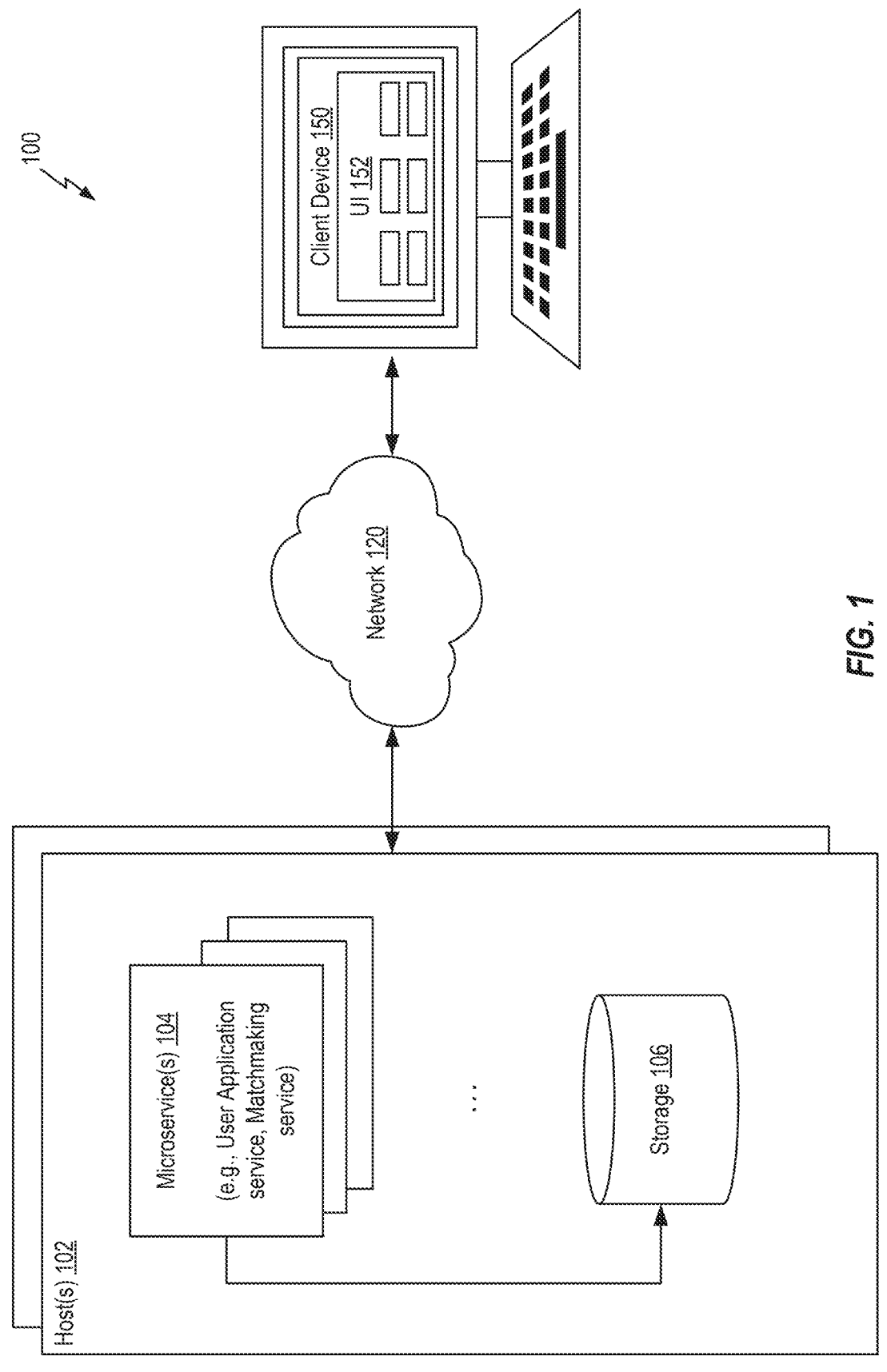
FIG. 1 depicts an example computing environment implementing an example matchmaking service.

Existing entity matching systems employ one or more techniques, such as distance-based matching algorithms, graph-based matching algorithms, machine learning-based matching algorithms, and collaborative filtering algorithms. As one example, distance-based matching algorithms, like Euclidean distance, Manhattan distance, or Cosine similarity, calculate mathematical distances between entity vector representations to determine compatibility scores. As another example, graph-based matching algorithms attempt to solve the matching optimization problem associated with entity matching systems by modeling entities as nodes in a graph structure and seeking optimal edge assignments that maximize overall matching utility between entities. However, existing entity matching systems suffer from several technical problems.

For example, while computationally straightforward, the matching accuracy of distance-based algorithms degrades as the number of features increases. Graph-based algorithms are computationally intensive and incur large time latencies, making them impractical for large-scale systems with thousands of entities and/or systems that need to deliver real-time responses.

Other technical problems associated with existing entity matching techniques, like the aforementioned distance-based and graph-based matching algorithms, include the inability to dynamically adapt to changing entity preferences, availability, or other system conditions. In particular, existing algorithms may rely on static models or parameters that can become outdated as user behavior changes, leading to decreased matching relevance over time. Another technical problem arises with resource utilization when matching algorithms consumer excessive computational resources, memory, or network bandwidth, particular during peak usage periods. These inefficiencies can lead to system bottlenecks, increased operational costs, and overall degraded user experience.

These and other technical problems create a compelling need for improved entity matching systems that can provide accurate, scalable, and efficient matching capabilities, while maintaining adaptability in dynamic, multi-entity environments. Accordingly, the present disclosure describes entity matching systems and corresponding methods that improve upon the state-of-the-art and provide technical solutions to the aforementioned technical problems associated with existing entity matching systems. In some aspects, the present disclosure is directed to entity matching systems that match users to assistants who are able to help the users with various tasks. However, such matching systems as disclosed herein can be used for many additional practical applications.

Embodiments of entity matching systems described herein may be configured to update assistant profiles and match updated assistant profiles to target user profiles and corresponding tasks. In particular, assistants provide assistant data to a data input module, which processes the assistant data and extracts assistant attributes. A target user, or user, associated with a target user profile is able to select a recommended assistant to help the target user complete one or more tasks. During the task completion, a data collection module monitors the activity of the assistant and records interaction data into activity logs. Once the task is completed, the entity matching system is configured to prompt the target user to provide user feedback, such as indicating a user satisfaction regarding the assistant and completed task.

The assistant attributes, interaction data, and user feedback are processed by a security and privacy control module in order to remove personal information to reduce any security risks. The clean data from the security and privacy control module is then provided as input to a language model, which generates a feature set based on the assistant attributes, interaction data, and user feedback included in the clean data. The feature set is used to update the assistant profile. The updated assistant profile is stored in the assistant profiles database. The entity matching system can then match new target users to assistants using the updated assistant profiles database.

Accordingly, the entity matching systems described herein are able to improve assistant recommendations over time and adapt to dynamically changing attributes of the users and assistants. In this manner, the entity matching systems are able to stay up-to-date with the capabilities of assistants and preferences of users. As another technical solution, the entity matching systems herein overcome the problem of degraded user matches with increasing entity features because the entity matching systems are able to analyze many different attributes associated with the user profiles and target assistant profiles.

Further, the automatic processes described herein for updating profiles and performing profile matching uses an ordered combination of specific computing actions to render information into a specific format, such as the feature set generated by a language model, that is then used and applied to create desired results, including automatically updating profiles and providing recommendations for matching assistant profiles to user profiles based on the updated profiles. The ordered combination of specific computing actions refers to a structured sequence of algorithmic steps and corresponding rules that the matchmaking service applies to process and transform raw input data, such as assistant data, interaction data, and client feedback, into a standardized, actionable format, such as a generated feature set, for downstream use.

For example, in some aspects, the matchmaking service applies rules to validate and sanitize incoming assistant attributes and interaction data, removing any incomplete or sensitive information. Next, the matchmaking service applies classification and extraction rules to identify relevant features-such as areas of expertise, performance metrics, and communication style from the cleaned data. These extracted features are then organized according to a predefined schema, ensuring consistency and compatibility with the language model's input requirements. The language model is then prompted, using a set of instructions that reflect the combined rules, to generate a structured feature set. This feature set is mapped to corresponding fields in the assistant profile according to mapping rules, and the updated profile is used in further rule-based or machine learning-based matching processes. By following this combined and ordered set of rules, the system ensures that information is consistently rendered into a specific, machine-readable format, enabling reliable automatic profile updating and precise, data-driven recommendations for matching assistant profiles to user profiles.

While the following disclosure refers to one example practical application of matching assistants and users for tasks related to tax regulations and tax return filings, the entity matching systems and corresponding methods described herein may be used to match entities in any multi-entity environment, and thus for many other practical applications.

Example System Implementing a Matchmaking
Service in a Communication Service

FIG. 1 depicts an example system 100 supporting a plurality of microservice(s) 104 (e.g., software-defined services, which in some cases, may be cloud-native). As shown in FIG. 1, system 100 includes a user device 150 and a host 102. Network 120 may provide connectivity between user device 150 and host 102. Network 120 may include, for example, a direct link, a local area network (LAN), a wide area network (WAN) (such as the Internet), another type of network, or a combination of one or more of these networks.

Host 102 may be geographically co-located servers on the same rack or on different racks in any arbitrary location in a data center. Host 102 may be implemented on a server-grade hardware platform. Host 102 or the hardware platform may include components of a computing device, such as one or more processors (e.g., central processing units (CPUs)), one or more memories (e.g., random access memory (RAM)), one or more network interfaces (e.g., physical network interfaces (PNICs)), storage 106, and/or other components, as described elsewhere herein. Storage 106 and other example components of an apparatus that may implement host 102 are described elsewhere herein.

Host 102 in system 100 may host a set of one or more of the microservice(s) 104 (collectively referred to herein as "microservice(s) 104"). The microservice(s) 104 may be deployed using virtual machines (VMs) and/or container(s) implemented on host 102). For example, host 102 may implement a hypervisor (not shown) that abstracts processor, memory, storage, and networking resources of hardware platform of host 102). Generally, a microservice is a loosely coupled and independently deployable service or software that, alone or in combination with one or more other microservice(s) 104, may make up an application. Microservice(s) 104 may enable segmented, granular level functionalities within a larger system infrastructure. A reference to a single microservice can encompass multiple microservice(s) 104 unless context indicates otherwise.

User device 150 may include a user interface (UI), such as UI 152. UI 152 may be usable to communicate with microservice(s) 104 via network 120. For example, communication between user device 150 and one or more of microservice(s) 104 may be facilitated by one or more application programming interfaces (APIs). An API is a set of rules and protocols that allows different software applications to communicate and share data with each other. Non-exhaustive examples of user device 150 may include a smartphone, a personal computer, a tablet, or a laptop computer. In some examples, microservice(s) 104 may interact with another microservice, an application, a host, or the like, via network 120.

As shown in FIG. 1, in certain aspects, a first microservice of microservice(s) 104 implements a user-application service, which is any network 120 accessible service that maintains user accounts associated with one or more software platforms. In some aspects, the user-application service provides document filing services, such as tax filing services, for users. In certain aspects, the user-application service stores its data in storage 106.

In certain aspects, a second microservice of microservice(s) 104 implements a matchmaking service. The matchmaking service may be a service used to identify compatible assistants for a target user associated with the communication service. For example, in certain aspects, the matchmaking service may use one or more techniques (e.g., such as techniques for updating, clustering, and ranking, described herein) to match one or more assistants as matches for the target user. A respective assistant is compatible with a target user when the attributes, such as an area of expertise, of the assistant match the expertise needed to complete a task, such as filing a tax return, requested by the target user. For example, an assistant may be compatible with filing a federal tax return when the assistant has expertise with federal tax regulations.

Though FIG. 1 depicts host 102, storage 106, and user device 150 as single devices for case of illustration, one or more of host 102, storage 106, and/or user device 150 may be embodied in a variety of forms. Further, though FIG. 1 depicts only one host and one user device, other examples may include a different number of hosts and/or user devices. User device 150 may use any combination of microservice(s) 104 on any host 102 where microservice(s) 104 are deployed.

Figure 2:
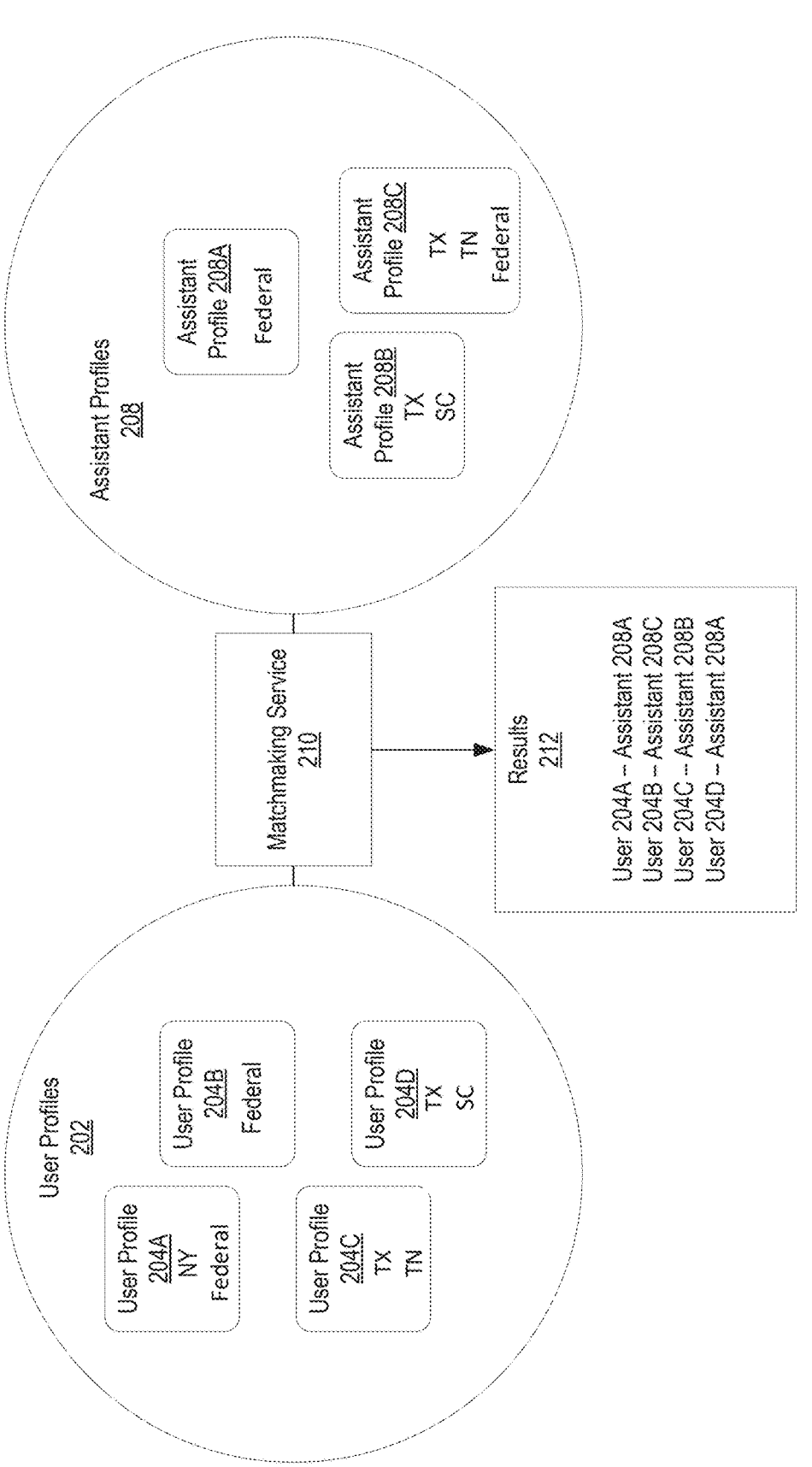
FIG. 2 depicts a flow diagram for matching assistant profiles and user profiles.

FIG. 2 depicts a flow diagram for matching assistant profiles and user profiles. In particular, matchmaking service 210 is configured to receive inputs, including user profiles 202 and assistant profiles 208, and generate results 212 based on matching the user profiles and assistant profiles. In some aspects, the user profiles and assistant profiles are configured as JSON files. As depicted in FIG. 2, user profiles 202 include a plurality of user profiles, such as user profile 204A, user profile 204B, user profile 204C, and user profile 204D. While four user profiles are shown, user profiles 202 may include any number of user profiles. Each user profile includes attributes about one or more tasks that the user corresponding to a respective user profile would like an assistant to help with. In some aspects, the tasks include filing one or more tax returns. Accordingly, user profile 204A includes attributes indicating a "NY" state tax return and a "Federal" tax return. User profile 204B includes attributes indicating a "Federal" tax return. User profile 204C includes attributes that indicate a "TX" state tax return and a "TN" state tax return. User profile 204D includes attributes that indicate a "TX" state tax return and a "SC" state tax return.

Assistant profiles 208 include a plurality of assistant profiles, such as assistant profile 208A, assistant profile 208B, and assistant profile 208C. While assistant profiles 208 includes three assistant profiles, assistant profiles 208 may include any number of assistant profiles. Each assistant profile includes attributes relating to an area of expertise of the assistant corresponding to a respective assistant profile. For example, assistant profile 208A includes attributes indicating a "Federal" tax return expertise. Assistant profile 208B includes attributes indicating a "TX" state tax return expertise and a "SC" state tax return expertise. Assistant profile 208C includes attributes indicating a "TX" state tax return expertise, "TN" state tax return expertise, and "Federal" tax return expertise.

Matchmaking service 210 is configured to analyze a user profile, such as user profile 204A, and each assistant profile of assistant profiles 208 to predict a "best match" for matching an assistant profile to the user profile. In some aspects, matchmaking service 210 is configured to analyze each user profile and each assistant profile in order to determine a "best match" for each user profile of user profiles 202. For example, in some aspects, matchmaking service 210 generates results 212, which includes a plurality of matched profiles of user profiles and assistant profiles. As depicted in FIG. 2, matchmaking service 210 determined that user profile 204A matches assistant profile 208A, user profile 204B matches assistant profile 208C, user profile 204C matches assistant profile 208B, and user profile 204C matches assistant profile 208A.

The results generated by the matchmaking service 210, including the matched pairs of user profiles and assistant profiles, may be leveraged in a variety of downstream technical applications to improve system performance, resource allocation, and automated workflow management. For example, these matches can be used to trigger automated routing protocols within a computing environment, dynamically allocate processing resources, or initiate secure data exchanges between system components. The results may further enable the system to generate context-aware notifications, pre-populate user interfaces with relevant data, or automatically configure access permissions for collaborative digital workspaces. Additionally, the matched data can be utilized by machine learning modules to refine predictive models, enhance the accuracy of future matching operations, and support adaptive system optimization based on real-time feedback. By integrating these results into the broader system architecture, the platform achieves improved computational efficiency, reduced latency in automated decision-making, and enhanced scalability for handling large volumes of matching requests in a secure and compliant manner.

Clustering and Matching Assistant Profiles

Figure 3:
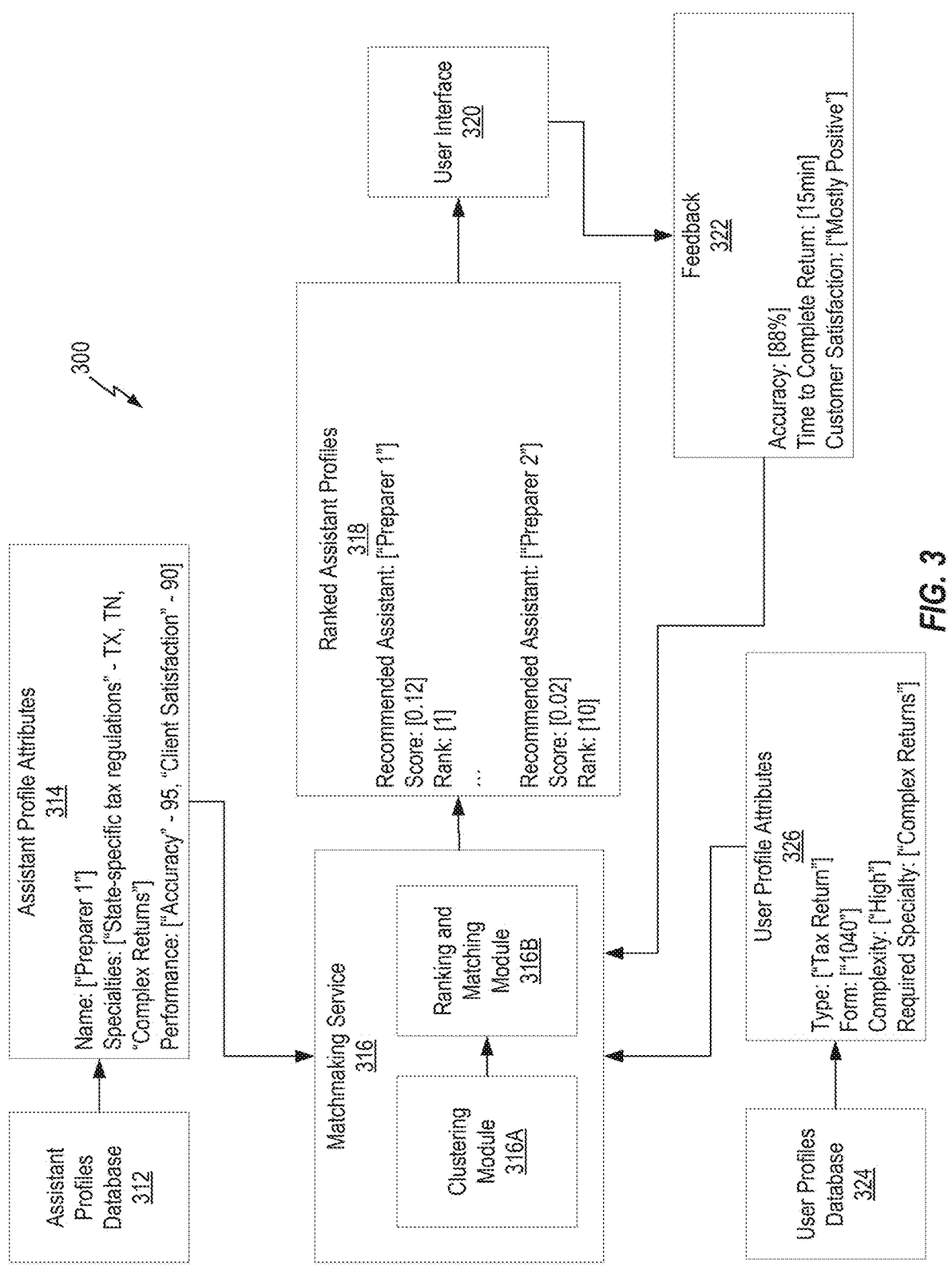
FIG. 3 depicts a flow diagram for clustering and matching assistant profiles and user profiles.

FIG. 3 depicts a process flow diagram for clustering and matching assistant profiles and user profiles based on assistant profile attributes and user profile attributes. Flow diagram 300 includes a matchmaking service 316, an assistant profiles database 312, a task database, and a user interface 320. In some aspects, matchmaking service 316 is comparable to matchmaking service 210 of FIG. 2, assistant profiles database 312 comprises assistant profiles, such as assistant profiles 208 of FIG. 2, and user profile database comprises user profiles, such as user profiles 202 of FIG. 2. In some aspects, results 212 of FIG. 2 is based on ranked assistant profiles 318.

Assistant profiles include assistant profile attributes, such as a name, expertise in one or more specialties, and one or more performance metrics. In some aspects, expertise attributes include state-specific tax regulations, such as "NY" or "TX," federal tax regulations, and/or complex returns. Complex returns may refer to tax returns that include both state and federal tax filings, multiple state filings, personal and corporation tax filings, and/or a combination thereof. Some examples of performance metrics include accuracy and user satisfaction. In some aspects, accuracy indicates a percentage of filings that were accurate, and user satisfaction indicates a percentage of filings of which the user was satisfied. For example, assistant profile attributes 314 are included in an assistant profile, including Name: "Preparer 1", Specialties: "State-specific regulations-TX, TN" and "Complex Returns", a performance metric for accuracy of "95" and a performance metric for user satisfaction of "90". In some aspects, an assistant profile may also include attributes indicating past tasks, and/or past users that have been matched with the assistant profile.

User profiles, such as those included in user profiles database 324, include user profile attributes, such as type of task, form, complexity level, and required specialty. For example, user profile attributes 326 may be associated with a target user profile, including type: "Tax Return", form: "1040", complexity: "High", and required specialty: "Complex Returns." In this example, the complexity is "High," and the required specialty is "Complex Returns" because the target user profile includes attributes for a state ("NY") filing and federal filing. A combination of state and federal filings is one example of a "Complex Return."

In some aspects, a user profile may be associated with one or more tasks (e.g., one or more tax returns). In such aspects, matchmaking service 316 may also include a task database, wherein each task is represented by a task profile. In some aspects, the task profile includes attributes such as task type, complexity level, specific qualifications required for task completion, and other task attributes. Task profiles may be configured as JSON files. In the example of tax returns, the task profile may be a tax return profile, including the type of tax return, the form associated with the tax return, whether the tax return is a state or federal filing, a complexity level, or other tax return attributes. In some aspects, a user profile may also include attributes indicating past tasks, and/or past assistants that have been matched with the user profile. As an example, a user profile may include one or more task profiles and/or may be linked to one or more task profiles.

As shown in FIG. 3, matchmaking service 316 includes a clustering module 316A that is configured to perform data clustering and a ranking and matching module 316B. In some aspects, the clustering module 316A is implemented as a neural language processing (NLP) module. In particular, NLP enables the conversion of unstructured or structured text into numerical representations that can be further processed. NLP can also be used to interpret and classify the key requirements from various tax return tasks and the specializations from the assistant profiles. Thus, text-based documents and files can be transformed into vector representations that capture semantic meaning. Similar documents and files can then be clustered together based on the similarity of vector representations. There are several clustering techniques that may be used to cluster user profiles and assistant profiles, such as term frequency-based techniques, topic modeling, and embedding-based clustering.

Term frequency-based techniques convert documents to vectors based on word frequencies, apply clustering algorithms, such as K-means or hierarchical clustering, and group similar profiles together based on vocabulary or attribute usage. Topic modeling techniques, such as Latent Dirichlet Allocation (LDA), can be used to discover abstract topics within profiles, wherein profiles can be clustered based on their topic distributions. Embedding-based clustering uses word or document embeddings, such as Word2Vec, GloVe, or BERT, to capture semantic relationships between words and profiles. This allows for clustering of profiles based on meaning rather than exact word or attribute matches. Such techniques, or other clustering techniques, may be used by the clustering module 316A to generate one or more user profiles clusters and one or more assistant clusters.

In some aspects, ranking and matching module 316B is configured to perform ranking and matching of user profiles and assistant profiles. In particular, matchmaking service 316 identifies a target user profile (e.g., a target user profile associated with the user profile attributes 326) and generates a ranking of one or more assistant profiles based on how well matched the assistant profile is to the target user profile. In some aspects, matchmaking service 316 first identifies a target assistant cluster, and compares the target user profile with one or more assistant profiles included in the target assistant cluster. Each potential assistant-user pair is analyzed and scored based on compatibility through similarity scoring and classification techniques. Based on comparing the target user profile with the assistant profiles in the target assistant cluster, matchmaking service 316 is configured to generate ranked assistant profiles 318 including one or more assistant-user pairs.

Ranked assistant profiles 318 include one or more assistant profiles that are ranked based on how well the respective assistant profile matches the target user profile. As shown in FIG. 3, ranked assistant profiles 318 includes a first recommended assistant (e.g., "Preparer 1") that received a matching score of [0.12] and a first ranking (e.g., Rank: [1]). Ranked assistant profiles 318 includes one or more additional recommended assistants, up through, for example, a tenth ranking position. For example, "Preparer 2" is a recommended assistant with a matching score of [0.02] and tenth ranking (e.g., Rank: [10]). In some aspects, the matching score represents a predicted success rate of a match between an assistant profile and a target user profile based on historical data, performance metrics, and attributes of the assistant profile and the target user profile.

The ranked assistant profiles 318 are then transmitted to and displayed at user interface 320 to be reviewed by a user corresponding to the target user profile. In some aspects, a top k (where k is a non-negative, non-zero integer) number of assistant profiles of ranked assistant profiles 318 are displayed at user interface 320. In some aspects, the most compatible assistant profile is recommended for the target user profile. The most compatible assistant profile is the assistant profile whose corresponding assistant has the most matching attributes to the target user profile.

In some aspects, the assistant profiles are ranked based on an availability of the assistant to perform the task requested by the target user. For example, some assistant profiles may not be active or may already be matched with another user of the user-application service. In another example, an assistant corresponding to an assistant profile may not be able to complete a task within a timeframe or deadline indicated by the task and/or user. Thus, in certain aspects where an assistant is not available to complete a task, the corresponding assistant profile will be ranked lower and/or removed from the ranking of assistant profiles for the target user. In some aspects, the availability information is provided by the assistant, such as in assistant data 403 of FIG. 4, which is then included in the assistant profile associated with the assistant. In some aspects, the availability information is automatically extracted based on a status of the assistant profile within the matchmaking service 316. For example, the matchmaking service 316 may be configured to detect whether an assistant profile is already matched to a user profile and/or is associated with a task that is still in progress.

The user may then confirm at least one of the recommended assistants, wherein the task associated with the target user profile (e.g., "Tax Return") is transmitted to the recommended assistant. In some aspects, the user declines one or more of the recommended assistants. The system is configured to receive a completed task from the assistant and provide the completed task to the user corresponding to the target user profile. At this stage, the user has the opportunity to review the completed task (e.g., the filed tax return documents) and provide user input to the system.

In some aspects, the user input includes feedback, such as feedback 322, from the user about the completed task. As shown in FIG. 3, in some instances, feedback 322 includes both system feedback, such as an accuracy score (e.g., 88%) and the time it took to complete the task (e.g., 15 minutes), as well as user feedback, such as customer satisfaction score. In some aspects, the customer satisfaction score is a binary score, indicating, for example, whether the customer was satisfied or not satisfied. In some aspects, the customer satisfaction score is based on a customer satisfaction score scale, such as negative, mostly negative, somewhat negative, neutral, somewhat positive, mostly positive, and positive, or a numerical scale, such as 1-10, with 1 being unsatisfied and 10 being satisfied with the assistant's performance on the task.

In some aspects, feedback 322 is used to update one or more assistant attributes associated with the target assistant profile. For example, based on feedback 322, the target user profile may be updated to reflect a new accuracy score or a new user satisfaction score. In some aspects, the matchmaking service 316 updates assistant attributes such as accuracy score or user satisfaction score by calculating a simple arithmetic average over all historical feedback received for the assistant, ensuring that each feedback instance contributes equally to the updated metric. In some aspects, the matchmaking service 316 employs a weighted or exponential moving average, where more recent feedback is assigned a higher weight than older feedback, allowing the updated attribute to more rapidly reflect recent performance trends and changes in service quality. This approach enables the matchmaking service 316 to dynamically adapt to improvements or declines in an assistant's performance, providing a more responsive and current representation of their capabilities.

In some aspects, the matchmaking service 316 determines that a new user satisfaction score for the target assistant profile does not meet a minimum user satisfaction score, wherein the matchmaking service 316 will downgrade the likelihood of a new user being matched to the target assistant profile. In some aspects, if the matchmaking service 316 determines that an assistant profile has a user satisfaction score that does meet a minimum user satisfaction score, the matchmaking service 316 will remove that assistant profile from the assistant profiles database 312.

In addition to being used to update one or more assistant profiles, feedback 322 may also be used to update the clustering module 316A and/or ranking and matching module 316B in order to improve the data clustering, ranking, and matching techniques employed by the matchmaking service 316. For example, the matchmaking service 316 used the collected data from feedback 322 to adjust and refine the clustering module 316A and the ranking and matching module 316B to improve the accuracy and effectiveness of the clustering, ranking, and matching results.

Updating Assistant Profiles

Figure 4:
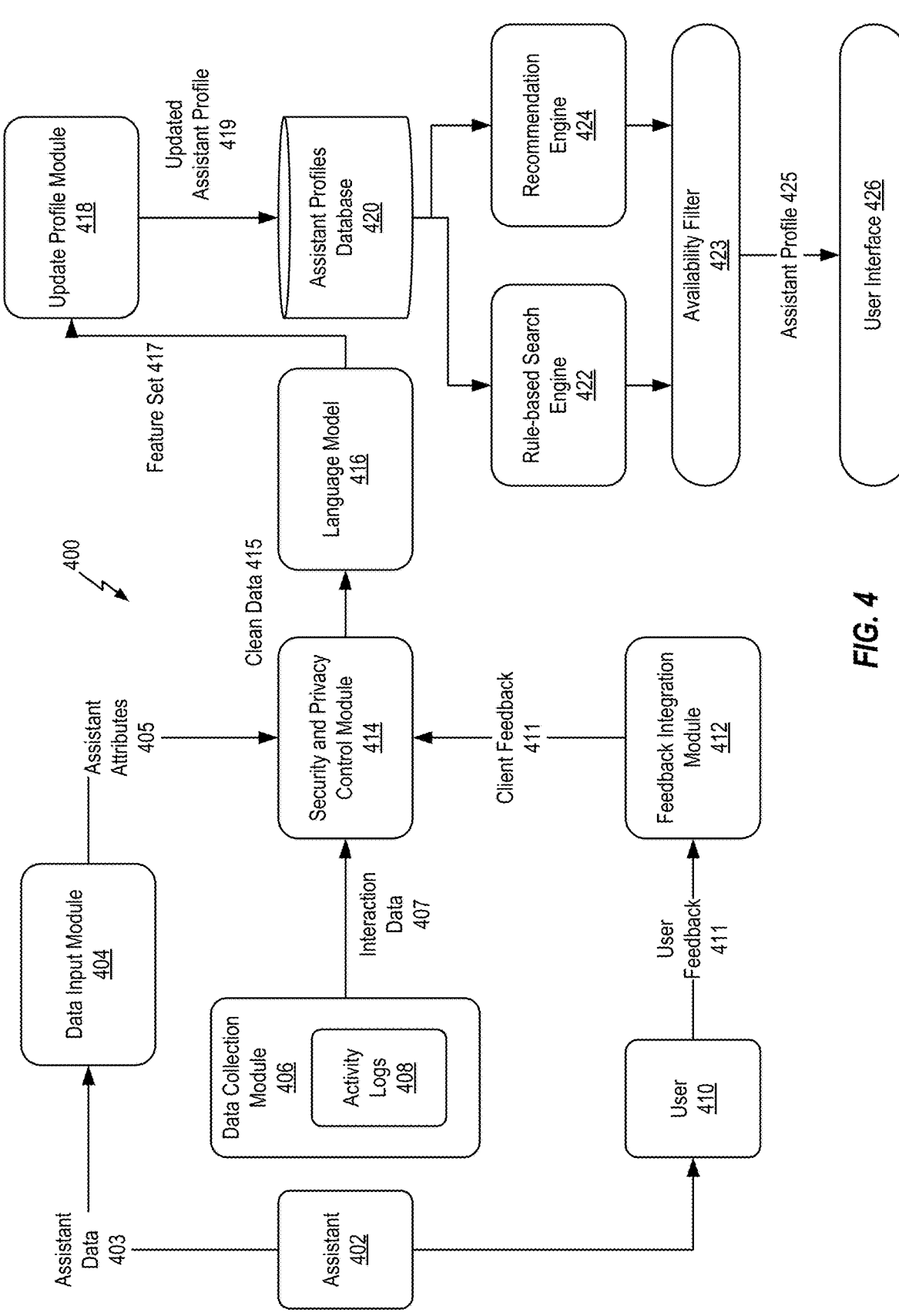
FIG. 4 depicts a flow diagram for updating assistant profiles based on assistant data, interaction data, and user feedback.

FIG. 4 depicts a flow diagram for updating assistant profiles based on assistant data, interaction data, and user feedback. The matchmaking service is then able to match user profiles with updated assistant profiles. In particular, the matchmaking service 400 is configured to enable continuous, real-time updates to assistant profiles, such as assistant profiles included in assistant profiles database 312 of FIG. 3, by leveraging a combination of assistant data 403 provided by the assistant 402, activity logs 408 comprising interaction data 407, and user feedback 411. The matchmaking service 400 improves the accuracy of entity matching between assistant profiles and user profiles, for example, in domains like tax preparation.

As shown in FIG. 4, matchmaking service 400 comprises a data input module 404, a data collection module 406, a feedback integration module 412, a security and privacy control module 414, a language model, such as language model 416, and an update profile module 418, which are each used to update assistant profiles database 420. Using the assistant profiles database 420 which is updated with feature set 417, the matchmaking service 400 is able to match an assistant profile, such as assistant profile 425, to a new user, using a rule-based search engine 422 and/or recommendation engine 424. Each of the aforementioned components are described in more detail below as part of the process for updating and matching the assistant profiles.

Data Input Module

An assistant 402, such as a tax-preparer professional, provides assistant data 403 to data input module 404. Assistant data 403 comprises the initial set of information submitted by the assistant user upon registration or onboarding into the system. This assistant data 403 typically includes structured details such as the assistant's full name, professional qualifications, certifications (e.g., CPA, EA), years of experience, and areas of tax expertise (such as individual, business, multi-state, or international tax). In some aspects, assistant data 403 further includes a record of prior experience, including the types of tax cases previously handled, complexity levels managed, and any industry specializations (for example, high-net-worth individuals, real estate investors, or cryptocurrency taxation). Assistant data 403 may also include proficiency with specific tax preparation software platforms, preferred working hours or availability, language proficiencies, and any relevant jurisdictional or state-specific certifications. This initial data forms the initial assistant profile for the assistant and is subsequently augmented and refined through interaction data 407 and user feedback 411 as the assistant continues to interact with users associated with the user application service.

The data input module 404 is configured to receive and process assistant data 403 provided by assistant 402, and output the assistant attributes 405. Upon registration or onboarding, the assistant 402 enters a variety of structured information via a user application service, including personal details, professional qualifications, certifications, years of experience, areas of tax expertise, prior case history, software proficiency, availability, and language skills. The data input module 404 validates the completeness and format of the submitted information, ensuring that all required fields are populated and that the data adheres to expected formats. For example, the data input module 404 may verify that certification numbers are valid or that years of experience are within a reasonable range. The data input module 404 may also perform initial categorization or tagging of the data, such as associating the assistant 402 with specific tax domains or jurisdictions based on the provided expertise and certifications. Once validated and categorized, the assistant attributes 405 are transmitted to the security and privacy control module 414, where sensitive information is sanitized before being used in downstream profiling and matching operations. Security and privacy control module 414 is described in further detail below.

Data Collection Module

The data collection module 406 monitors interactions between the assistant 402 and one or more users, such as user 410, and stores the interaction data 407 in one or more of the activity logs 408. Interaction data 407 comprises information captured by the data collection module 406 as it monitors and records the interactions between the assistant 402 and one or more users, such as user 410. Interaction data 407 includes a variety of details related to the assistant's engagement with users during the course of task completion. Specifically, interaction data 407 may comprise timestamps of communications, communication transcripts or summaries, records of document exchanges, the duration and frequency of each interaction, and indicators of responsiveness or engagement, such as response times to user inquiries. Additionally, interaction data 407 may include metadata about the communication channel used (e.g., chat, email, phone), as well as any notes or annotations made by the assistant during the interaction. This comprehensive set of the interaction data 407 is utilized to update and refine the assistant's profile, providing a dynamic and accurate representation of the assistant's performance, communication style, and user service capabilities based on actual interactions with users.

Activity logs 408 are structured or semi-structured records maintained by the data collection module 406 to capture and store the interaction data. Structured records are data entries that adhere to a fixed schema or format, such as tables with predefined columns and data types (e.g., a database table where each row represents an activity and each column represents a specific attribute like timestamp, action type, or user ID). Semi-structured records, on the other hand, do not follow a rigid schema but still contain organizational properties that make them easier to parse than unstructured data; examples include JSON or XML files where data fields may vary between entries but are still labeled and organized in a hierarchical or tagged format. In the context of activity logs 408, structured records might include standardized log entries with consistent fields for every interaction, while semi-structured records could include logs where some fields are optional or vary depending on the type of activity being recorded.

The activity logs 408 aggregate both the interaction data 407 between the assistant 402 and user 410 and additional task-related activities, such as a start and stop time associated with the task completion, performed by the assistant 402. Activity logs 408 may include entries such as the types of tax forms processed (e.g., Schedule C, Schedule E, etc.), the complexity and nature of cases handled (such as multi-property rentals, high-net-worth individuals, or cryptocurrency transactions), the specific tax preparation software utilized, and the sequence and timing of each action taken during the engagement. By maintaining a comprehensive history of the assistant's ongoing activities and engagements, activity logs 408 provide a rich source of interaction data 407 for dynamically updating the assistant's profile, enabling the matchmaking service 400 to reflect the assistant's evolving expertise, responsiveness, and service quality over time.

Feedback Integration Module

As shown in FIG. 4, user 410 provides user feedback 411, which includes information about the assistant 402 and completion of the task, such as a tax-filing preparation. User feedback 411 may include quantitative ratings (for example, a numerical score out of five or ten), satisfaction scores (such as Net Promoter Score, or NPS), and qualitative comments describing the user's perception of the assistant's knowledge, professionalism, communication, and overall service quality. User feedback 411 can also encompass specific remarks about the assistant's responsiveness, clarity in explanations, ability to handle complex cases, and any areas for improvement.

The feedback integration module 412 is configured to receive and process the user feedback 411 submitted by user 410. Upon receipt, the feedback integration module 412 identifies both quantitative and qualitative feedback, including numerical ratings, satisfaction scores, and written comments. Feedback integration module 412 organizes and formats this feedback, ensuring that all relevant information, such as user ratings, specific remarks about the assistant's performance, and any suggestions for improvement, is captured in a structured manner. The feedback integration module 412 then transmits the user feedback 411 to the security and privacy control module 414, where any sensitive or personally identifiable information is sanitized before the user feedback 411 is used in downstream processing. By systematically collecting and preparing user feedback 411, the feedback integration module 412 enables the dynamic profiling system to incorporate real-world user experiences into the ongoing refinement and updating of assistant profiles, thereby supporting more accurate and adaptive entity matching.

Security and Privacy Control Module

The assistant attributes 405, interaction data 407, and user feedback 411 are provided to the security and privacy control module 414. The security and privacy control module 414 is responsible for ensuring that all data used by the matchmaking service is processed in compliance with privacy regulations and organizational security standards. Upon receiving these data inputs, the security and privacy control module 414 performs a series of sanitization and validation steps. This includes removing or redacting private personal information (PPI), such as names, contact details, or any other personally identifiable information, as well as filtering out sensitive content or profane language that may be present in free-text fields or communication transcripts.

Security and privacy control module 414 may also apply data masking or anonymization techniques to further protect the identities of both assistants and users. In addition, the security and privacy control module 414 validates the format and integrity of the incoming data, ensuring that only clean, non-sensitive, and properly structured information is passed downstream for further processing by the language model 416 and other system components. By systematically sanitizing and securing all assistant data, interaction data, and user feedback, the security and privacy control module 414 safeguards user privacy, reduces the risk of data breaches, and ensures that the profiling and matching processes operate on compliant and trustworthy data.

Language Model

Clean data 415 from security and privacy control module 414 is provided as input to a language model, such as language model 416, to generate feature set 417. Clean data 415 refers to the sanitized and validated information output by the security and privacy control module 414. This data includes assistant attributes, interaction data, and user feedback that have been stripped of PPI, sensitive content, and any inappropriate language. The clean data 415 is thus free of identifiers and formatted to ensure compliance with privacy regulations and organizational security standards, while retaining all relevant details necessary for downstream processing.

The language model 416 is configured to process the clean data 415, leveraging advanced natural language processing techniques to extract, interpret, and synthesize meaningful information from the clean data 415. Specifically, the language model 416 analyzes the clean data 415 to identify features relevant to the assistant's expertise, performance, and service quality. This includes extracting features such as areas of tax specialization, proficiency with specific tax forms or software, communication style, responsiveness, user satisfaction metrics, and qualitative insights from user feedback. The language model 416 may also perform contextual modeling, sentiment analysis, and entity recognition to capture nuanced aspects of the assistant's interactions and outcomes. The result of this processing is the generation of feature set 417, which comprises characteristics of the assistant's profile in a format that is suitable for downstream matching and recommendation services.

In some aspects, the matchmaking service 400 employs a series of distinct, context-specific prompts tailored to the type of information being processed by the language model 416. For example, one prompt may instruct the model to extract structured attributes such as certifications, years of experience, and software proficiency from the assistant attributes 405, while another prompt may direct the model to perform sentiment analysis and summarize user feedback 411 from user comments. As another example, a prompt for extracting features from the interaction data 407 may instruct the language model 416 to analyze communication transcripts and activity logs to extract features such as response times, frequency and duration of interactions, communication style, and indicators of engagement or user satisfaction, organizing these insights into a structured format for profile updating. Additional prompts can be designed to identify and categorize areas of tax specialization, detect communication style from interaction transcripts, or recognize performance trends based on historical task data. In such aspects, each prompt is crafted to include explicit instructions, relevant context, and, where applicable, schema definitions or examples to guide the model's output. By modularizing the prompt design in this way, the matchmaking service 400 ensures that the language model 416 can reliably extract, interpret, and synthesize the comprehensive and diverse set of features required for dynamic profile updating and downstream matching.

In some aspects, only one prompt is provided to the model instead of distinct, context-specific prompts. For example, the matchmaking service 400 may generate a comprehensive, multi-part prompt that instructs the language model 416 to perform all required extraction and analysis tasks in a single inference pass. This unified prompt may include detailed instructions and schema definitions for extracting structured attributes (such as certifications, years of experience, and software proficiency), performing sentiment analysis on user feedback, identifying areas of tax specialization, detecting communication style, and summarizing performance trends. The unified prompt may use explicit section headers, bullet points, or JSON schema templates to delineate each required output, ensuring the language model 416 understands how to organize and return the extracted features in a structured format, such as feature set 417.

Generating the feature set 417, rather than simply using the clean data 415 as-is to update the assistant profiles, provides several technical benefits. For example, the feature set distills complex, heterogeneous data into a standardized and structured representation, enabling efficient comparison and matching across a large pool of assistant profiles. As another example, the feature set captures nuanced and latent attributes, such as communication effectiveness, adaptability to complex cases, or trends in user satisfaction, that may not be directly observable from raw data alone. Additionally, by leveraging the LLM's ability to interpret unstructured text and extract high-value features, the matchmaking service can determine insights that would otherwise be lost or overlooked if the matchmaking service 400 were to clean data 415 directly. This approach enhances the accuracy, relevance, and adaptability of the assistant profiles, supporting more precise and context-aware entity matching, and ultimately leading to improved outcomes for both assistants and users.

Update Profile Module

The update profile module 418 receives feature set 417 generated by the language model 416 and utilizes this feature set to update the assistant profiles stored in the assistant profiles database. For example, update profile module 418 will replace an outdated version of an assistant profile associated with assistant 402 in assistant profiles database 420 with updated assistant profile 419. In some aspects, assistant profiles database 420 is comparable to assistant profiles database 312 of FIG. 3. In some aspects, the update profile module 418 is configured to map each extracted feature in the feature set 417, such as newly identified areas of expertise, updated proficiency with specific tax forms or software, recent performance metrics, communication style indicators, responsiveness scores, and aggregated user satisfaction ratings, into the corresponding fields of the assistant's profile.

For example, in some aspects, the update profile module 418 utilizes a predefined schema or data model that defines the structure and fields of the assistant's profile. Each element in the feature set 417 is associated with a specific field in this schema. For example, if the feature set includes a new area of expertise such as "cryptocurrency taxation," the update profile module 418 identifies the "areas of expertise" field in the assistant profile and appends or updates it with this new specialization. If the feature set 417 includes an updated user satisfaction score, the update profile module 418 overwrites the previous value in the "user satisfaction" field with the new score.

For categorical features like communication style, the update profile module 418 may use a lookup table to translate extracted descriptors (e.g., "formal and detailed") into standardized profile tags. As a simple example, if the feature set 417 includes {"software_proficiency": "Professional Tax Software", "response_time": "<2 hours"}, the update profile module 418 updates the "software proficiency" field to "Professional Tax Software" and the "average response time" field to "<2 hours" in the assistant's profile. This systematic mapping ensures that each extracted feature is accurately and consistently reflected in the structured profile, enabling reliable downstream matching and recommendations. In some aspects, the update profile module 418 may also maintain a historical log of profile changes, enabling the matchmaking service 400 to track the evolution of the assistant's skills and performance over time.

As another example, if the feature set 417 generated by the language model 416 indicates that the assistant 402 has recently completed several tax returns involving cryptocurrency transactions, the update profile module 418 will update the assistant's profile to reflect a new or enhanced area of expertise in cryptocurrency taxation. If the feature set 417 includes a high user satisfaction score and positive feedback regarding the assistant's responsiveness and communication style, the update profile module 418 will update the corresponding fields in the assistant profile to show an improved user satisfaction metric and may further annotate the profile with a "fast response" or "excellent communicator" tag.

If the feature set 417 reveals that the assistant has gained proficiency with a new tax preparation software platform, this new software proficiency will be added to the assistant's profile. Similarly, if the feature set 417 identifies that the assistant 402 has successfully handled complex multi-state filings or high-net-worth individual cases, the assistant profile will be updated to include these as new specializations.

In cases where the feature set 417 includes negative feedback or identifies areas for improvement, such as slower response times during peak season or lower satisfaction scores for a particular type of case, the update profile module 418 may adjust the assistant's performance metrics downward or flag the assistant profile for review. The update profile module 418 may also append qualitative insights, such as "highly recommended for complex cases" or "needs improvement in timeliness," based on the aggregated user comments and sentiment analysis performed by the language model 416.

By updating these features, the assistant's profile remains an accurate and dynamic reflection of their current skills, experience, and service quality, ensuring that future matches are based on the most relevant and up-to-date information. By systematically incorporating the most current and relevant features into the assistant profiles, the update profile module 418 ensures that each assistant profile accurately represents the assistant's real-world expertise, experience, and service quality. This dynamic updating process enables the matchmaking service 400 to make more informed and precise recommendations, since the assistant profiles used for matching are reflective of the assistant's latest capabilities and user feedback.

Matchmaking Based on Updated Assistant Profiles

The matchmaking service 400 analyzes the updated assistant profiles for matching assistant profiles with target user profiles by leveraging either a rule-based search engine 422, a recommendation engine 424, or a combination of both. Each engine utilizes the most current assistant profile data, which has been dynamically updated to reflect real-time activities, user feedback, and extracted feature sets.

When the rule-based search engine 422 is employed, the matchmaking service 400 applies a set of one or more predefined rules to the assistant profiles. These predefined rules may include requirements such as jurisdictional certifications, minimum years of experience, specific areas of tax expertise, availability, or user satisfaction thresholds. The rule-based approach is particularly effective for scenarios where the matching criteria are straightforward, binary, or mandated by regulatory or business requirements. For example, if a firm administrator needs to quickly identify all assistants certified in a particular state or with a certain level of user satisfaction, the rule-based search engine 422 can efficiently filter and present a list of qualified candidates.

The recommendation engine 424 utilizes machine learning models and/or collaborative filtering techniques to analyze the updated assistant profiles in conjunction with the attributes of the target user profiles and tasks. The recommendation engine 424 considers a broader and more complex set of features than the rule-based search engine 422, such as historical task types, feedback sentiment, communication style, and performance trends, to predict compatibility between assistant profiles and tasks and generate ranked recommendations. This approach is especially valuable when the matching scenario involves nuanced or multidimensional criteria, or when the goal is to optimize for overall fit and user satisfaction rather than simply meeting minimum requirements.

In some aspects, the matchmaking service 400 may use the rule-based search engine 422 and the recommendation engine 424 in combination. For example, the rule-based search engine 422 is used to first narrow down the pool of candidates by applying hard constraints, after which the recommendation engine 424 ranks the filtered candidates based on predicted compatibility. As another example, the recommendation engine 424 may be used as the primary matching tool, with the rule-based search engine 422 serving as a post-processing filter to ensure compliance with mandatory requirements. The matchmaking service 400 may also allow firm administrators to select which engine to use based on the complexity of the task, the urgency of the match, or organizational preferences. By supporting both rule-based and recommendation-based matching, the matchmaking service 400 provides flexibility, efficiency, and precision in pairing assistants with target user and corresponding tasks.

In some aspects, an availability filter 423 may be used within the matchmaking service 400 to ensure that only assistant profiles corresponding to assistants who are currently available are considered for matching with a user's task. The availability filter 423 operates by checking real-time or scheduled availability data associated with each assistant profile, such as calendar status, ongoing assignments, or user-defined working hours, before generating match results. If an assistant profile is already assigned to another user profile/task, the assistant profile is marked as unavailable, or cannot meet the required timeframe for the new task, that assistant's profile is excluded from the pool of potential matches. By applying this availability filter, the matchmaking service 400 increases the likelihood that the matched assistant can promptly and effectively complete the user's task, thereby improving user satisfaction and operational efficiency.

Example User Interface for Matchmaking Service

Through the user interface 426, users can initiate searches for suitable assistants by specifying criteria relevant to a particular task or user need. The user interface 426 allows users to apply filters or select from predefined rules-such as jurisdiction, years of experience, or user satisfaction thresholds-when utilizing the rule-based search engine 422. When the recommendation engine 424 is employed, the user interface displays ranked recommendations generated by the system, often accompanied by compatibility scores, key profile attributes, and supporting rationale for each suggested match.

The user interface 426 also enables users to view detailed assistant profiles, including dynamically updated assistant profiles such as areas of expertise, performance metrics, communication style, and recent user feedback. Users can compare multiple assistant profiles side-by-side, review historical performance data, and access qualitative insights extracted by the language model at the user interface 426. In some embodiments, the user interface 426 may provide interactive prompts or recommendations, guiding users through the process of confirming or declining a match, and allowing for feedback on the quality of the recommendations provided.

Figure 9:
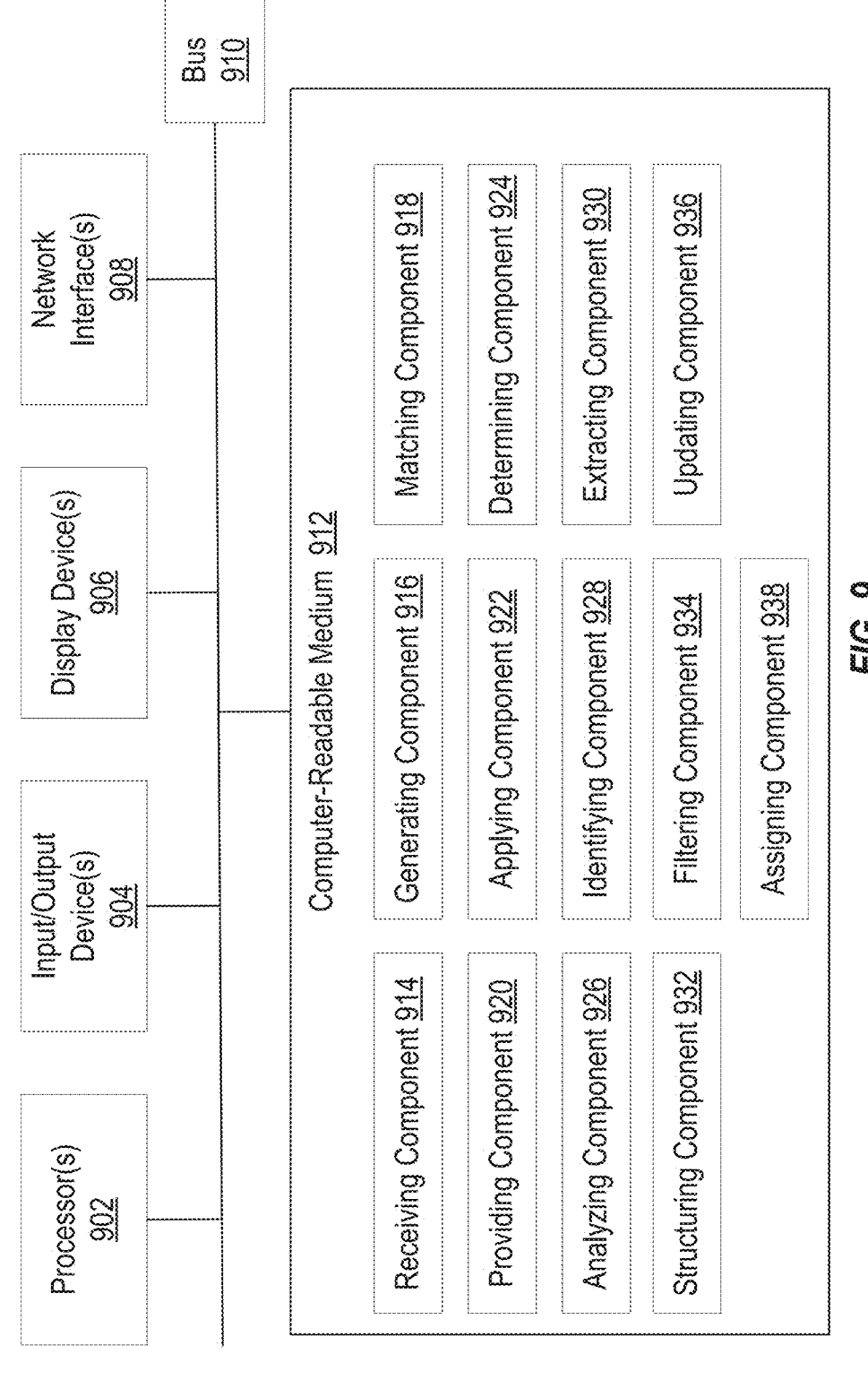
FIG. 9 depicts an example processing system with which aspects of the present disclosure can be performed.

In some aspects, each module depicted in FIG. 4 is implemented by processing system illustrated in FIG. 9 and may be executed on the hardware platform shown in FIG. 1. For example, the data input module, data collection module, feedback integration module, security and privacy control module, language model, and update profile module of FIG. 4 correspond to specific software components stored in computer-readable medium 912 and executed by processor (s) 902 of the processing system 900 in FIG. 9. These components are further supported by input/output device(s) 904, display device(s) 906, and network interface(s) 908, which facilitate data entry, user interaction, and communication with external systems as shown in FIG. 1. Accordingly, each module is realized as a combination of software instructions and hardware resources, such as memory, processors, and communication interfaces, for performing the described functions of the matchmaking service herein.

Matchmaking Features

Figure 5:
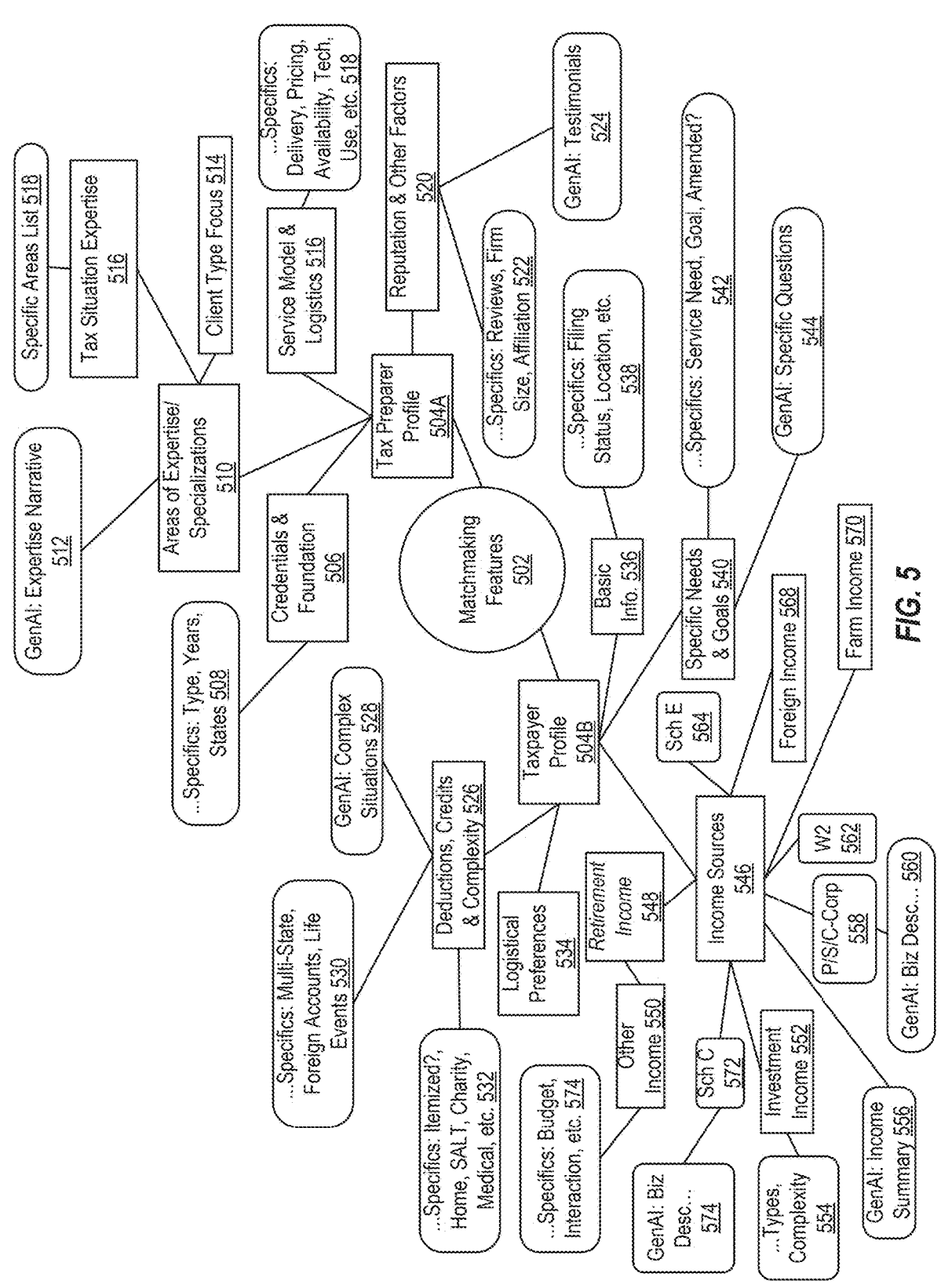
FIG. 5 depicts a diagram comprising example features used for updating assistant profiles and matching assistant profiles to user profiles.

FIG. 5 depicts a diagram comprising example features used for updating assistant profiles and matching assistant profiles to user profiles. As illustrated in FIG. 5, the matchmaking features 502 revolve around multiple example profiles, including the tax preparer profile 504A, and the taxpayer profile 504B. In some aspects, tax preparer profile 504A is comparable to an assistant profile, for example, associated with assistant 402 of FIG. 4, and taxpayer profile 504B is comparable to a user profile, for example, associated with user 410 of FIG. 4. The tax preparer profile 504A is updated with features, for example features from feature set 417 of FIG. 4, which are identified and extracted from multiple data sources, such as assistant data, interaction data, and user feedback.

As shown in FIG. 5, tax preparer profile 504A includes a plurality of features, including feature 506 related to credentials and foundation, feature 510 related to areas of expertise and specializations, feature 516 related to service model and logistics, and feature 520 related to reputation and other factors. Feature 506 relates to the tax preparer's credentials and foundational qualifications, such as certifications, licenses, and years of experience, and is further associated with feature 508, which includes specifics such as type of credentials, years credentialed, and states of licensure. Feature 510 captures the tax preparer's areas of expertise and specializations, including specific tax domains, user types, or complex case experience, and is further related to feature 512, which may represent a specific area of expertise such as a generative artificial intelligence (GenAI) expertise narrative. The assistant profile may have more than one area of expertise or specialization, such as feature 514 associated with user type focus, which refers to the preparer's specialization in serving particular categories of users, and/or feature 516 associated with tax situation expertise.

Feature 516 describes the service model and logistical preferences of the tax preparer, such as availability, preferred communication channels, and workflow practices, and may further include a specific areas list that details the preparer's expertise in various tax situations. For example, feature 516 is also further related to feature 518, which includes other specifics about the service model and logistics, such as delivery of completed tasks, pricing, availability, technology used, or other specifics. Feature 520 encompasses reputation and other factors, including user satisfaction ratings, testimonials, and overall professional standing in the field. In some aspects, feature 520 is related to feature 522 which includes specifics related to reputation and other factors, including firm size, reviews, and affiliations and is related to feature 524, which refers to GenAI testimonials.

As shown in FIG. 5, taxpayer profile 504B is associated with a plurality of features, including feature 526 associated with deductions, credits, and complexity, feature 534 associated with logistical preferences, feature 540 associated with specific needs and goals, feature 546 associated with income sources, and feature 536 associated with basic information. Feature 526 encompasses specifics as illustrated by feature 530 and feature 532, such as itemized deductions, state, and local tax (SALT) considerations, charitable contributions, medical expenses, multi-state filings, foreign accounts, life events, and GenAI complex situations (feature 528), all of which contribute to the overall complexity of the taxpayer's return. Feature 534 relates to logistical preferences, such as preferred communication channels, timing, or other process-related requirements.

Feature 540 is further related to feature 542, which includes specifics such as the taxpayer's specific needs and goals (for example, whether the taxpayer is seeking a particular service, has a defined financial objective, or requires an amended return), and to feature 544, which is associated with GenAI specific questions. Feature 546 is associated with the taxpayer's income sources, including retirement income 548, Schedule C income 572, investment income 552, pass-through or S/C-Corp income 558 (and corresponding feature 560 including a GenAI business description), W-2 income 562, Schedule E income 564, farm income 570, and foreign income 568, each of which may impact the tax filing process. Retirement income further includes other income 550, which relates to feature 574 including specifics such as budget and interaction.

In some aspects, Schedule C income 572 further includes feature 574 which is a GenAI business description. Investment income 552 may further relate to feature 554 which includes specifics such as types and complexity of investment income. Feature 536 relates to feature 538, which includes specifics such as filing status, location, and other foundational data. In some aspects, feature 546 may also relate to feature 556, which includes a GenAI income summary.

Collectively, matchmaking features 502 provide an example feature-based representation of both the assistant and taxpayer profiles. This enables the matchmaking system to accurately pair the taxpayer with an assistant whose expertise and service model align with the taxpayer's unique circumstances and requirements. In some aspects, the matchmaking features 502 that are associated with the tax preparer profile 504A are comparable to one or more features identified by language model 416 and included in feature set 417. Additionally, in some aspects, matchmaking features 502 that are associated with the taxpayer profile 504B are comparable to user profile attributes 326 of FIG. 3.

Task Complexity and Experience Level

Figure 6:
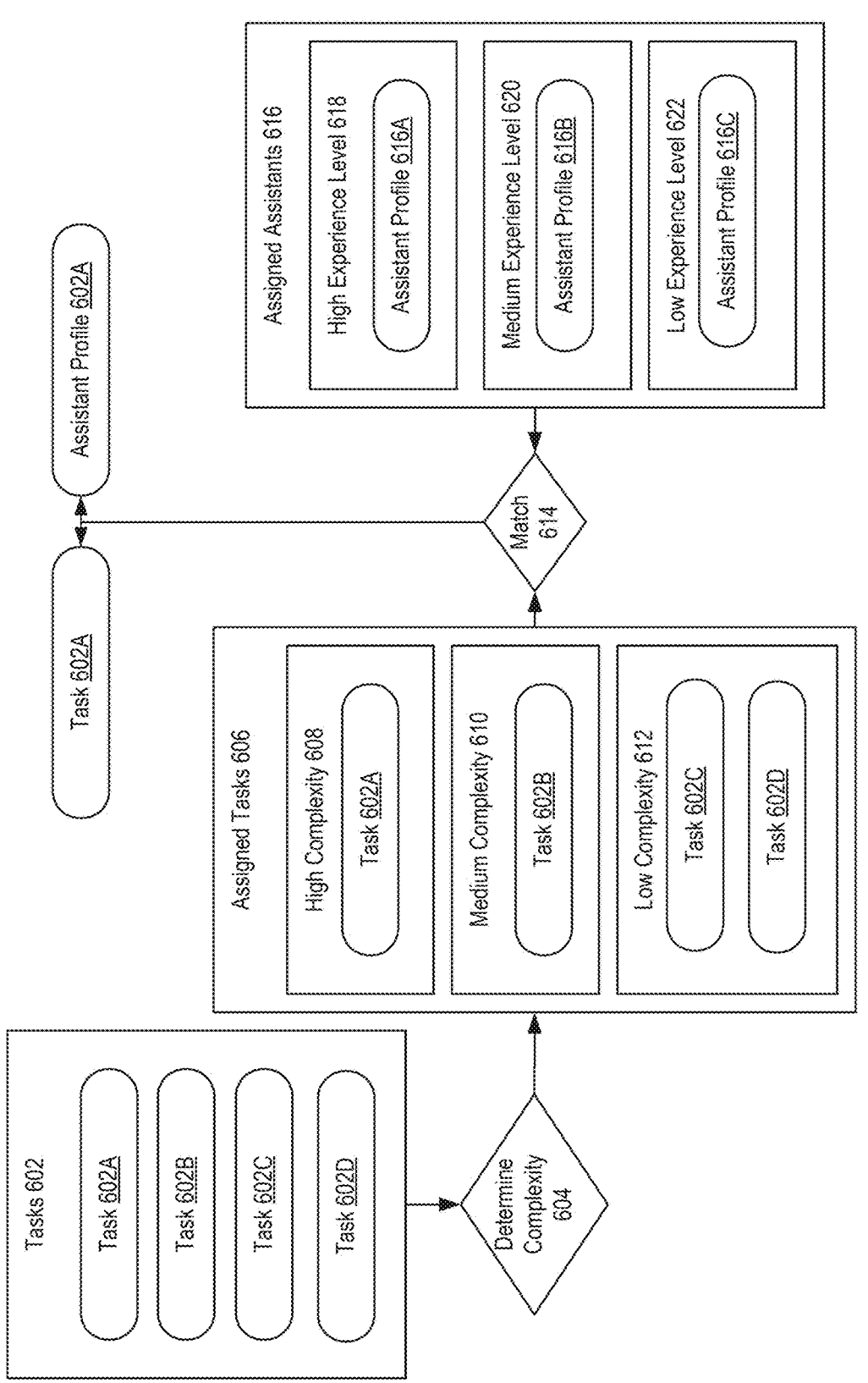
FIG. 6 depicts a flow diagram for matching assistant profiles and user profiles based on task complexity and assistant experience level.

FIG. 6 depicts a flowchart diagram illustrating the process of matching tasks to assistants based on task complexity and assistant experience levels. In particular, the matchmaking service, such as matchmaking service 400 of FIG. 4, identifies a plurality of tasks, such as tasks 602, associated with one or more target user profiles.

In particular, FIG. 6 depicts the tasks 602 including task 602A, task 602B, task 602C, and task 602D. For example, task 602A may involve preparing a complex individual tax return that includes multiple sources of income, such as wages, investment income, and rental property income, as well as the need to file both federal and multiple state returns. Task 602B could involve assisting a small business owner with the preparation and filing of business tax forms, such as Schedule C for sole proprietorship income, and calculating deductions for business expenses, home office use, and vehicle mileage. Task 602C could involve preparing a straightforward individual tax return for a single filer with only W-2 wage income and no itemized deductions or additional schedules required. Task 602D could involve filing a simple joint tax return for a married couple with standard deduction, no dependents, and only basic income sources such as W-2 wages and minimal interest income.

At action 604, the matchmaking service determines a complexity of each of the tasks 602 and assigns each task to a particular complexity level. In some aspects, the matchmaking service determines the complexity of each task by analyzing the task's attributes and content using a set of predefined rules or an algorithmic scoring system. For example, the matchmaking service extracts relevant data points from the tasks, such as the number and types of required forms, the presence of multi-state or international elements, the diversity and nature of income sources, and any specialized requirements like cryptocurrency or real estate transactions. Each attribute is assigned a weight or score based on its contribution to overall task complexity. The matchmaking service then aggregates these scores or evaluates the presence of certain criteria to generate a total complexity score for the task. This score is compared against established thresholds to classify the task as high, medium, or low complexity, ensuring that the assignment of complexity levels is objective, repeatable, and scalable across different types of tasks.

As shown in FIG. 6, the matchmaking service determines that task 602A is a high complexity task and assigns it to high complexity level 608. Task 602B is determined to be a medium complexity task and is assigned to medium complexity level 610. Task 602C and task 602D are determined to be low complexity tasks and are assigned to low complexity level 612.

The matchmaking service determines whether a task is high, medium, or low complexity by analyzing various factors associated with each task. These factors may include the number and types of tax forms required, the presence of multi-state or international filings, the diversity and complexity of income sources, the need for specialized tax expertise (such as cryptocurrency or real estate), and the overall number of steps or calculations involved. For example, a task involving multiple income streams, multiple state tax returns, and complex deductions would be classified as high complexity and assigned to high complexity level 608. A task requiring the preparation of business tax forms with some itemized deductions and moderate complexity would be assigned to medium complexity level 610. In contrast, tasks involving only basic W-2 income and standard deductions, with no additional schedules or special circumstances, would be classified as low complexity and assigned to low complexity level 612.

In some aspects, similar to task categorization, assistant profiles are assigned to an experience level category. The matchmaking service determines an experience level for each assistant by evaluating a range of assistant attributes that reflect the assistant's background, expertise, and historical performance. In some aspects, these attributes correspond to features identified in assistant attributes 405 of FIG. 5 and/or feature set 417 of FIG. 4. Attributes considered include the total number of years of professional experience, the types and complexity of tax cases previously handled, relevant certifications or licenses (such as CPA or EA), and areas of tax specialization (for example, multi-state filings, high-net-worth individuals, or cryptocurrency taxation). The matchmaking service may also consider proficiency with specific tax preparation software, historical user satisfaction scores, and performance metrics such as accuracy rates and average response times.

In some aspects, the matchmaking service determines the experience level of each assistant by analyzing the assistant's profile attributes using a set of predefined rules or an algorithmic scoring system, similar to the process used for determining task complexity. For example, the matchmaking service extracts relevant data points from the assistant's profile, such as the total number of years of professional experience, the types and complexity of tax cases previously handled, certifications or licenses (e.g., CPA or EA), areas of tax specialization, proficiency with specific tax preparation software, and historical client satisfaction scores. Each attribute is assigned a weight or score based on its relevance to overall experience. The matchmaking service then aggregates these scores or evaluates the presence of certain criteria to generate a total experience score for the assistant. This score is compared against established thresholds to classify the assistant into a high, medium, or low experience level. This objective and repeatable process ensures that assistants are consistently categorized according to their demonstrated expertise and historical performance, enabling accurate and scalable matching to tasks of appropriate complexity.

As shown in FIG. 6, assistant profile 616A is associated with an assistant user who has a high level of experience and thus is assigned to high experience level 618. For example, assistant profile 616A may correspond to an assistant who has over ten years of tax preparation experience, holds advanced certifications (such as CPA or EA), and has successfully handled complex cases involving multi-state filings, high-net-worth individuals, and specialized tax scenarios like cryptocurrency or international income. Assistant profile 616B is associated with an assistant user who has a medium level of experience and so is assigned to medium experience level 620. As an example, assistant profile 616B may represent an assistant with several years of experience, proficiency in standard business and individual tax returns, and a track record of managing moderately complex cases, such as small business filings with some itemized deductions. Assistant profile 616C is associated with an assistant user who has a low level of experience and is assigned to low experience level 622. As an example, assistant profile 616C may be associated with a newer assistant who has recently completed certification, has limited professional experience, and primarily handles straightforward individual tax returns with basic W-2 income and standard deductions.

Once the tasks have been assigned a complexity category and the assistant profiles have been assigned an experience level, the matchmaking service determines matches between assigned tasks 606 and assigned assistants 616 at action 614. In some aspects, tasks and assistant profiles are matched by aligning the complexity level of each task with the corresponding experience level of available assistants. As shown in FIG. 6, the matchmaking service matches the task 602A, which is a high complexity task, with assistant profile 616A, which is assigned to the high experience level 618. Accordingly, tasks categorized as high complexity are matched with assistants assigned to the high experience level, ensuring that the most challenging tasks are handled by the most qualified professionals. Similarly, tasks of medium complexity are paired with assistants at the medium experience level, while low complexity tasks are matched with assistants at the low experience level. This matching process takes into account not only the complexity and experience levels but may also consider additional factors such as specific areas of expertise, availability, and user preferences, resulting in optimal pairings that maximize the likelihood of successful task completion and user satisfaction.

Beneficially, as mentioned above, aspects of the matchmaking service herein is applicable to different domains, outside of a tax-filing user application service. The principles of matching tasks and assistants illustrated in FIG. 6 can be broadly applied to other non-tax domains by categorizing tasks based on their complexity and categorizing assistants based on their experience and relevant expertise. In any domain, the system can analyze the requirements and complexity of a given task—such as the technical depth needed for a software project or the medical specialization required for a patient case—and assign it to an appropriate complexity category. Similarly, assistants (such as engineers, consultants, or healthcare professionals) can be profiled according to their years of experience, certifications, areas of specialization, and historical performance.

The matchmaking service then aligns tasks with assistants whose experience levels and skill sets best match the complexity and requirements of the tasks. For example, a highly complex software engineering project would be matched with an engineer who has extensive experience in similar projects and relevant technical skills, while a routine IT support ticket could be assigned to a junior technician. In healthcare, a patient with a rare condition would be matched with a specialist who has handled similar cases, while routine consultations could be assigned to general practitioners. This approach ensures that resources are allocated efficiently, tasks are completed successfully, and both user and provider satisfaction are maximized in a wide range of industries and use cases.

Providing User Recommendations

Figure 7:
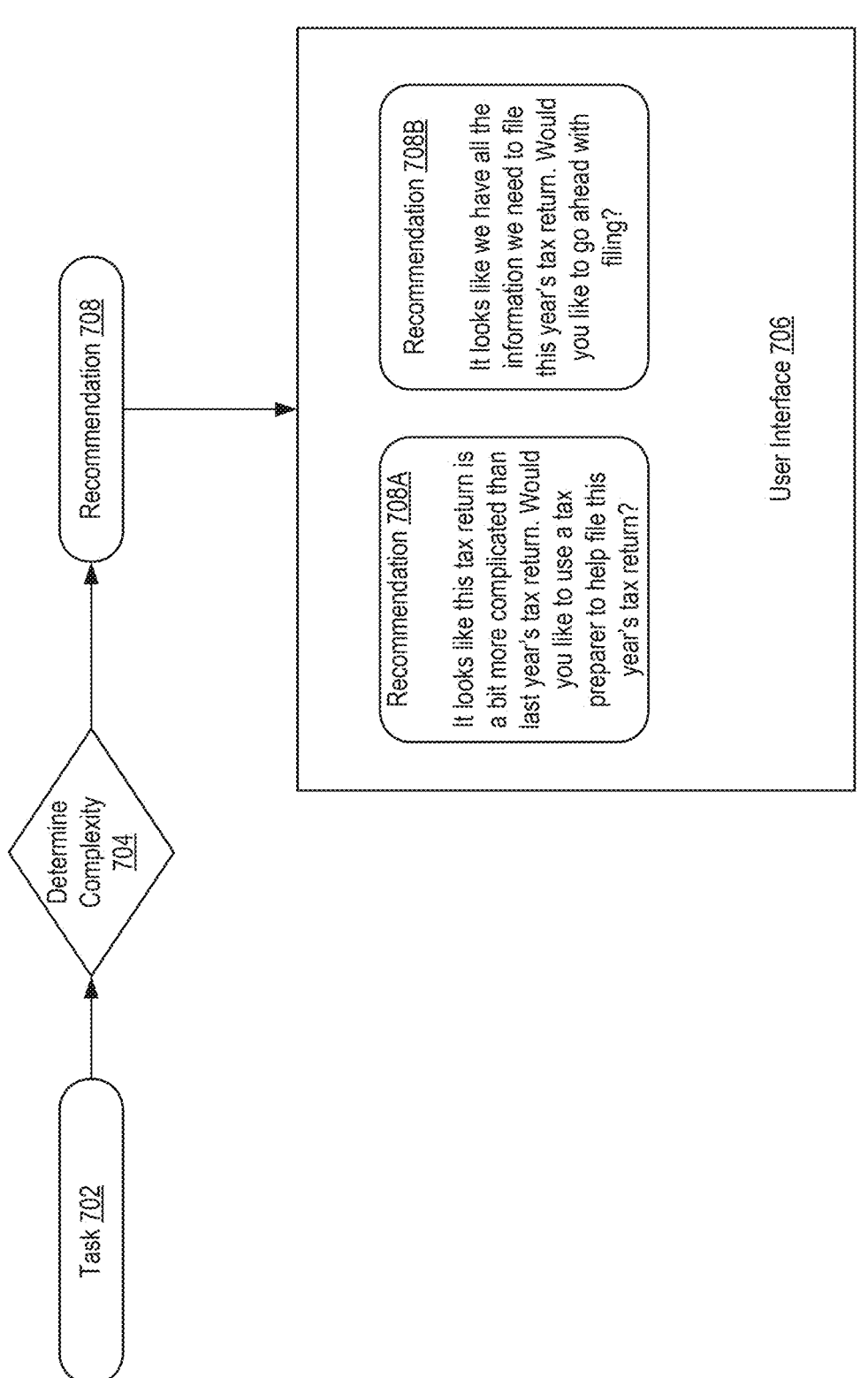
FIG. 7 depicts a flow diagram for providing a recommendation to a user based on a task complexity.

FIG. 7 depicts a flowchart diagram for providing user recommendations to target users based on a level of complexity of a task. As shown in FIG. 7, the matchmaking service receives a new task, such as task 702, associated with a target user. At action 704, the matchmaking service determines a level of complexity of task 702. For example, task 702 may have a high complexity level, a medium complexity level, or low complexity level, as described with respect to FIG. 6. Based on the level of complexity of the task 702, the matchmaking service is configured to generate recommendation 708 which will be provided to the target user via user interface 706. Recommendation 708 may include a recommendation to self-complete the task or to be matched with an assistant to complete the task. For example, if task 702 is a tax filing task, recommendation 708 may include a recommendation, such as recommendation 708B, for the target user to complete their tax filing with the user application service, or may include a recommendation, such as recommendation 708A, for the target user to be matched with an assistant who can assist in completing the tax filing task.

The matchmaking service would generate recommendation 708A when the matchmaking service determines that task 702 is of higher complexity, involves specialized requirements, and/or exceeds the target user's expertise or comfort level. For example, if the tax filing task involves multiple income sources, complex deductions, multi-state filings, or unique tax situations, the matchmaking service will generate recommendation 708A to ensure the user receives expert assistance from a qualified assistant. Similarly, if this year's tax filing appears to be more complex or involved than last year's tax filing for the target user, the matchmaking service may also generate recommendation 708A to be matched with an assistant.

Conversely, the matchmaking service will generate recommendation 708B when task 702 is determined to be straightforward or low in complexity. This may include scenarios where the target user has only basic W-2 income, qualifies for the standard deduction, and has no additional schedules or special circumstances. In such cases, the matchmaking service recognizes that the target user can likely complete the filing without professional assistance, streamlining the process and conserving resources.

Providing recommendations to the target user in this manner offers several technical benefits. First, it ensures that target users receive guidance tailored to the actual complexity and requirements of their specific task, which helps prevent both under- and over-utilization of professional resources. By directing target users with straightforward needs toward self-completion, the matchmaking service streamlines the task completion process, reduces unnecessary costs, and improves user autonomy. Conversely, for complex or specialized tasks, the matchmaking service proactively connects users with qualified assistants, reducing the risk of errors, increasing accuracy, and enhancing user confidence.

This approach also improves resource allocation by reserving expert assistance for cases where it is truly needed, which improves operational efficiency for the service provider of the user application service. Additionally, it enhances user satisfaction by providing clear, actionable recommendations that align with the target user's capabilities and the demands of the task, resulting in a more personalized and effective user experience.

Example Method for Entity Matching Based on Updated Assistant Profiles

FIG. 8 depicts an example method 800 for profile matching. In one aspect, method 800 can be implemented by the host 102 of FIG. 1 and/or processing system 900 of FIG. 9.

Method 800 begins at block 805 with receiving, from an assistant user, a first user input comprising one or more assistant attributes. In some aspects, receiving component 914 of FIG. 9 is configured to receive, from an assistant user, a first user input comprising one or more assistant attributes, such as assistant data 403 provided by assistant 402 as depicted in FIG. 4.

Method 800 then proceeds to block 810 with generating an assistant profile based on the one or more assistant attributes. In some aspects, generating component 916 of FIG. 9 is configured to generate an assistant profile based on the one or more assistant attributes, such as generating an initial profile for assistant 402 using assistant data 403 in FIG. 4.

Method 800 then proceeds to block 815 with matching the assistant profile to a target user profile and a task associated with the target user profile. In some aspects, matching component 918 of FIG. 9 is configured to match the assistant profile to a target user profile and a task associated with the target user profile, such as matching an assistant profile from assistant profiles 208 to a user profile from user profiles 202 for a specified task as depicted in FIG. 2.

Method 800 then proceeds to block 820 with receiving interaction data between the assistant user and a target user corresponding to the target user profile while the assistant user completes the task. In some aspects, receiving component 914 of FIG. 9 is configured to receive interaction data between the assistant user and a target user corresponding to the target user profile while the assistant user completes the task, such as interaction data 407 collected by data collection module 406 and stored in activity logs 408 as shown in FIG. 4.

Method 800 then proceeds to block 825 with receiving, from the target user, a second user input comprising feedback about the assistant user completing the task. In some aspects, receiving component 914 of FIG. 9 is configured to receive, from the target user, a second user input comprising feedback about the assistant user completing the task, such as user feedback 411 provided by user 410 and processed by feedback integration module 412 as shown in FIG. 4.

Method 800 then proceeds to block 830 with generating a prompt comprising a set of instructions for a language model to generate a feature set associated with the assistant user based on the one or more assistant attributes, the interaction data, and the feedback. In some aspects, generating component 916 of FIG. 9 is configured to generate a prompt comprising a set of instructions for a language model to generate a feature set associated with the assistant user based on the one or more assistant attributes, the interaction data, and the feedback.

Method 800 then proceeds to block 835 with providing the prompt, the first user input, the interaction data, and the second user input to the language model. In some aspects, providing component 920 of FIG. 9 is configured to provide the prompt, the first user input, the interaction data, and the second user input to the language model, such as supplying clean data 415, including assistant data 403, interaction data 407, and user feedback 411, to language model 416 as shown in FIG. 4.

Method 800 then proceeds to block 840 with receiving the feature set associated with the assistant user from the language model. In some aspects, receiving component 914 of FIG. 9 is configured to receive the feature set associated with the assistant user from the language model, such as receiving feature set 417 output by language model 416 as depicted in FIG. 4.

Method 800 then proceeds to block 845 with generating an updated assistant profile by modifying the assistant profile based on the feature set. In some aspects, receiving component 914 of FIG. 9 is configured to receive the feature set associated with the assistant user from the language model, such as receiving feature set 417 output by language model 416 as depicted in FIG. 4.

Method 800 then proceeds to block 850 with matching the updated assistant profile with a new target user profile associated with a new target user and a new task. In some aspects, matching component 918 of FIG. 9 is configured to match the updated assistant profile with a new target user profile associated with a new target user and a new task, such as using the updated assistant profile from assistant profiles database 420 to match with a new user profile and task as depicted in FIG. 4.

In some aspects, matching the updated assistant profile with the new target user is based on rule-based entity matching comprising: applying one or more predefined rules to compare features of the updated assistant profile and the new target user profile, the one or more predefined rules including at least one of: matching required jurisdiction or certification; determining that the updated assistant profile meets a minimum years of experience associated with the new task; determining that the updated assistant profile meets an availability to complete the new task, and determining that the updated assistant profile meets a minimum historical user satisfaction and a minimum performance threshold. In some aspects, applying component 922 of FIG. 9 is configured to apply one or more predefined rules to compare features of the updated assistant profile and the new target user profile, such as using rule-based search engine 422 of FIG. 4 to filter and match profiles based on specified criteria.

In some aspects, method 800 includes generating, using a machine learning model, a recommendation to match the updated assistant profile with a new target user profile, wherein the machine learning model, such as language model 416 of FIG. 4, is a supervised learning model selected from a group comprising a gradient boosting machine, a random forest, or a deep neural network, and is trained to predict a compatibility score between the updated assistant profile and candidate target user profiles based on features in the feature set associated with the assistant user, including assistant expertise, historical task types, user feedback ratings, task complexity, and prior matching outcomes.

In some aspects, generating, using the machine learning model such as language model 416 of FIG. 6, the recommendation to match the updated assistant profile with the new target user comprises generating, via generating component 916 of FIG. 9, a second prompt comprising a second set of instructions for the language model to: analyze information from the updated assistant profile and a plurality of candidate target user profiles; identify and extract a plurality of features from the updated assistant profile and the plurality of candidate target user profiles, wherein the plurality of features are relevant to matching the updated assistant profile to the new target user; structure the plurality of features into a format suitable for processing by the machine learning model; and provide the plurality of features to the machine learning model for generating a compatibility score or ranking for each candidate target user profile relative to the updated assistant profile. In some aspects, language model 416 of FIG. 4 utilizes analyzing component 926 of FIG. 9 to analyze information from the updated assistant profile and the plurality of candidate target user profiles; identifying component 928 of FIG. 9 and extracting component 930 of FIG. 9 to identify and extract the plurality of features; structuring component 932 of FIG. 9 to structure the plurality of features; and providing component 920 of FIG. 9 to provide the plurality of features, such as feature set 417, to the machine learning model for generating the compatibility score or ranking.

In some aspects, method 800 further includes determining a set of recency values related to how recent interaction data was received for each data point of interaction data. In some aspects, determining component 924 of FIG. 9 is configured to determine a set of recency values related to how recent interaction data was received for each data point of interaction data, such as evaluating timestamps associated with interaction data 407 and activity logs 408 as shown in FIG. 4.

In some aspects, method 800 further includes determining a set of weights associated with the interaction data and feedback for determining which interaction data and feedback will be relied on to match the updated assistant profile with the new target user profile. In some aspects, determining component 924 of FIG. 9 is configured to determine a set of weights associated with the interaction data and feedback for determining which interaction data and feedback will be relied on to match the updated assistant profile with the new target user profile, such as assigning weights to interaction data 407 and user feedback 411 based on their relevance and recency as depicted in FIG. 4.

In some aspects, method 800 further includes applying a higher weight to more recent interaction data and feedback and a lower weight to less recent interaction data and feedback based on the set of recency values, such that the language model is configured to match the updated assistant profile with the new target user profile based on higher weighted interaction data and feedback. In some aspects, applying component 922 of FIG. 9 is configured to apply a higher weight to more recent interaction data and feedback and a lower weight to less recent interaction data and feedback based on the set of recency values, such that the language model is configured to match the updated assistant profile with the new target user profile based on higher weighted interaction data and feedback, as illustrated by the processing of interaction data 407 and user feedback 411 in FIG. 4.

In some aspects, method 800 further includes matching the updated assistant profile with the new target user profile based on the higher weighted interaction data and feedback, such as a weighted version of interaction data 407 of FIG. 4 and user feedback 411 of FIG. 4.

In some aspects, block 850 includes filtering out candidate target user profiles based on not meeting one or more jurisdictional requirements associated with the task. In some aspects, matching component 918 of FIG. 9 is configured to match the updated assistant profile with the new target user profile based on the higher weighted interaction data and feedback, such as utilizing a weighted version of interaction data 407 of FIG. 4 and user feedback 411 of FIG. 4 to inform the matching process.

In some aspects, the assistant profile includes a performance trend indicator based on aggregated feedback over a plurality of completed tasks, further comprising updating the performance trend indicator based on the feature set. In some aspects, updating component 936 of FIG. 9 is configured to update the performance trend indicator included in the assistant profile based on aggregating the user feedback 411 of FIG. 4 over a plurality of completed tasks, further comprising updating the performance trend indicator based on the feature set 417 of FIG. 4.

In some aspects, method 800 includes: determining a complexity level of the new task; determining an experience level of the assistant user associated with the updated assistant profile; and matching the updated assistant profile with the new target user profile based on matching the complexity level of the new task to the experience level of the assistant user. In some aspects, determining component 924 of FIG. 9 is configured to determine a complexity level of the new task, such as analyzing task data associated with task 602A of tasks 602 of FIG. 6 and categorizing the new task into one of the complexity levels, including high complexity level 608 of FIG. 6, medium complexity level 610 of FIG. 6, or low complexity level 612 of FIG. 6. In some aspects, determining component 924 of FIG. 9 is configured to determine an experience level of the assistant user associated with the updated assistant profile of assistant profiles database 420 of FIG. 4, such as categorizing the assistant user profile into high experience level 618 of FIG. 6, medium experience level 620 of FIG. 6, or low experience level 622 of FIG. 6 based on historical performance and task complexity handled by the assistant user. In some aspects, matching component 918 of FIG. 9 is configured to match the updated assistant profile with the new target user profile based on matching the complexity level of the new task to the experience level of the assistant user, such as matching high complexity level 608 of FIG. 6, medium complexity level 610 of FIG. 6, or low complexity level 612 of FIG. 6 with high experience level 618 of FIG. 6, medium experience level 620 of FIG. 6, or low experience level 622 of FIG. 6.

In some aspects, method 800 further includes assigning the new task to a complexity category of a plurality of complexity categories. In some aspects, assigning component 938 of FIG. 9 is configured to assign the new task to a complexity category of a plurality of complexity categories, such as assigning tasks 602 of FIG. 6 into high complexity level 608 of FIG. 6, medium complexity level 610 of FIG. 6, or low complexity level 612 of FIG. 6.

In some aspects, method 800 further includes matching the updated assistant profile with the new target user profile based on the experience level of the assistant user associated with the updated assistant profile corresponding to the complexity category into which the new task was sorted. In some aspects, matching component 918 of FIG. 9 is configured to match the updated assistant profile with the new target user profile based on the experience level, such as high experience level 618 of FIG. 6, medium experience level 620 of FIG. 6, or low experience level 622 of FIG. 6, of the assistant user associated with the updated assistant profile corresponding to the complexity category into which the new task was assigned, as illustrated by assigned assistants 616 of FIG. 6 and assigned tasks 606 of FIG. 6.

In some aspects, method 800 further includes receiving task data associated with the new task from the new target user. In some aspects, receiving component 914 of FIG. 9 is configured to receive task data associated with the new task from the new target user, such as receiving task-related information provided by user 410 of FIG. 4.

In some aspects, method 800 further includes determining a complexity level of the new task. In some aspects, determining component 924 of FIG. 9 is configured to determine a complexity level of the new task, such as analyzing task data associated with task 602A of tasks 602 of FIG. 6, and categorizing the new task into one of the complexity levels, including high complexity level 608 of FIG. 6, medium complexity level 610 of FIG. 6, or low complexity level 612 of FIG. 6.

In some aspects, method 800 further includes generating a recommendation for the new target user to use a particular assistant user of a plurality of assistant users for completing the new task. In some aspects, generating component 916 of FIG. 9 is configured to generate a recommendation for the new target user to use a particular assistant user of a plurality of assistant users for completing the new task, such as providing a recommendation, such as recommendation 708 of FIG. 7, via the user interface 706 of FIG. 7 based on assistant profiles database 420 of FIG. 4 and complexity level determined at action 704 ("determine complexity") of FIG. 7.

In some aspects, method 800 further includes receiving user input confirming the recommendation for the new target user to use the particular assistant user for completing the new task, wherein matching the updated assistant profile with the new target user profile associated with the new target user and the new task is based on receiving the user input confirming the recommendation. In some aspects, receiving component 914 of FIG. 9 is configured to receive user input confirming the recommendation for the new target user.

Method 800 provides significant technical benefits and acts as a technical solution to the problems identified in the introduction of the detailed description, such as the limitations of existing entity matching systems which may be static, outdated, and/or resource-intensive. By implementing a dynamic, feedback-driven process for updating and matching assistant profiles, method 800 enables real-time adaptation to changes in assistant expertise, user preferences, and task complexity. Method 800 leverages advanced language model processing to extract nuanced features from structured and unstructured data—including assistant attributes, interaction logs, and user feedback—resulting in more accurate and context-aware profile updates.

This continuous updating and feature extraction process ensures that assistant profiles reflect the most current skills, experience, and performance metrics, directly addressing the problem of profile staleness and mismatch in existing entity matching systems. The integration of both rule-based and machine learning-based matching engines allows the matchmaking service herein to efficiently filter candidates using hard constraints and then optimize matches using predictive analytics, thereby reducing computational overhead and latency. Additionally, the use of recency-weighted data and performance trend indicators enables the system to prioritize recent, relevant information, further improving match quality and responsiveness.

By supporting complexity-based task assignment and experience-based assistant selection, method 800 enhances scalability and ensures that each task is matched to an appropriately skilled assistant, improving user satisfaction and operational efficiency. In summary, method 800 achieves technical solutions of dynamic profile management, adaptive matching, and resource-efficient operation, thereby overcoming the technical shortcomings of existing entity matching techniques.

Note that FIG. 8 is just one example of a method, and other methods including fewer, additional, or alternative operations are possible consistent with this disclosure.

Example Processing System for Entity Matching Based on Updated Assistant Profiles FIG. 9 depicts an example processing system 900 configured to perform various aspects described herein, including, for example, method 800 as described above with respect to FIG. 8.

Processing system 900 is an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 900 includes one or more processor(s) 902, one or more input/output device(s) 904, one or more display device(s) 906, one or more network interface(s) 908 through which processing system 900 is connected to one or more networks (e.g., a local network, an intranet, the Internet, or any other group of processing systems communicatively connected to each other), and computer-readable medium 912. In the depicted example, the aforementioned components are coupled by a bus 910, which may generally be configured for data exchange amongst the components. Bus 910 may be representative of multiple buses, while only one is depicted for simplicity.

Processor(s) 902 are generally configured to retrieve and execute instructions stored in one or more memories, including local memories like computer-readable medium 912, as well as remote memories and data stores. Similarly, processor(s) 902 are configured to store application data residing in local memories like the computer-readable medium 912, as well as remote memories and data stores. More generally, bus 910 is configured to transmit programming instructions and application data among the processor(s) 902, display device(s) 906, network interface(s) 908, and/or computer-readable medium 912. In certain embodiments, processor(s) 902 are representative of a one or more central processing units (CPUs), graphics processing unit (GPUs), tensor processing unit (TPUs), accelerators, and other processing devices.

Input/output device(s) 904 may include any device, mechanism, system, interactive display, and/or various other hardware and software components for communicating information between processing system 900 and a user of processing system 900. For example, input/output device(s) 904 may include input hardware, such as a keyboard, touch screen, button, microphone, speaker, and/or other device for receiving inputs from the user and sending outputs to the user.

Display device(s) 906 may generally include any sort of device configured to display data, information, graphics, user interface elements, and the like to a user. For example, display device(s) 906 may include internal and external displays such as an internal display of a tablet computer or an external display for a server computer or a projector. Display device(s) 906 may further include displays for devices, such as augmented, virtual, and/or extended reality devices. In various embodiments, display device(s) 906 may be configured to display a graphical user interface.

Network interface(s) 908 provide processing system 900 with access to external networks and thereby to external processing systems. Network interface(s) 908 can generally be any hardware and/or software capable of transmitting and/or receiving data via a wired or wireless network connection. Accordingly, network interface(s) 908 can include a communication transceiver for sending and/or receiving any wired and/or wireless communication.

Computer-readable medium 912 may be a volatile memory, such as a random access memory (RAM), or a nonvolatile memory, such as nonvolatile random access memory (NVRAM), or the like. In this example, computer-readable medium 912 includes receiving component 914, generating component 916, matching component 918, providing component 920, applying component 922, determining component 924, analyzing component 926, identifying component 928, extracting component 930, structuring component 932, filtering component 934, updating component 936, and assigning component 938. Processing of the components 914-938 may enable and cause the processing system 900 to perform the method 800 described with respect to FIG. 8, or any aspect related to it.

In certain embodiments, receiving component 914 is configured to receive, from an assistant user, a first user input comprising one or more assistant attributes, as described in FIG. 8 with reference to block 805. In certain embodiments, generating component 916 is configured to generate an assistant profile based on the one or more assistant attributes, as described in FIG. 8 with reference to block 810. In certain embodiments, matching component 918 is configured to match the assistant profile to a target user profile and a task associated with the target user profile, as described in FIG. 8 with reference to block 815. In certain embodiments, receiving component 914 is configured to receive interaction data between the assistant user and a target user corresponding to the target user profile while the assistant user completes the task, as described in FIG. 8 with reference to block 820.

In certain embodiments, receiving component 914 is configured to receive, from the target user, a second user input comprising feedback about the assistant user completing the task, as described in FIG. 8 with reference to block 825. In certain embodiments, generating component 916 is configured to generate a prompt comprising a set of instructions for a language model to generate a feature set associated with the assistant user based on the one or more assistant attributes, the interaction data, and the feedback, as described in FIG. 8 with reference to block 830. In certain embodiments, providing component 920 is configured to provide the prompt, the first user input, the interaction data, and the second user input to the language model, as described in FIG. 8 with reference to block 835.

In certain embodiments, receiving component 914 is configured to receive the feature set associated with the assistant user from the language model, as described in FIG. 8 with reference to block 840. In certain embodiments, generating component 916 is configured to generate a prompt comprising a set of instructions for a language model to generate an updated assistant profile by modifying the assistant profile based on the feature set, as described in FIG. 8 with reference to block 845. In certain embodiments, matching component 918 is configured to match the updated assistant profile with a new target user profile associated with a new target user and a new task, as described in FIG. 8 with reference to block 850.

Note that FIG. 9 is just one example of a processing system consistent with aspects described herein, and other processing systems having additional, alternative, or fewer components are possible consistent with this disclosure.

Example Clauses

Implementation examples are described in the following numbered clauses:

Clause 1: A method, comprising: receiving, from an assistant user, a first user input comprising one or more assistant attributes; generating an assistant profile based on the one or more assistant attributes; matching the assistant profile to a target user profile and a task associated with the target user profile; receiving interaction data between the assistant user and a target user corresponding to the target user profile while the assistant user completes the task; receiving, from the target user, a second user input comprising feedback about the assistant user completing the task; generating a prompt comprising a set of instructions for a language model to generate a feature set associated with the assistant user based on the one or more assistant attributes, the interaction data, and the feedback; providing the prompt, the first user input, the interaction data, and the second user input to the language model; receiving the feature set associated with the assistant user from the language model; generating an updated assistant profile by modifying the assistant profile based on the feature set; and matching the updated assistant profile with a new target user profile associated with a new target user and a new task.

Clause 2: The method of Clause 1, wherein matching the updated assistant profile with the new target user is based on rule-based entity matching comprising: applying one or more predefined rules to compare features of the updated assistant profile and the new target user profile, the one or more predefined rules including at least one of: matching required jurisdiction or certification; determining that the updated assistant profile meets a minimum years of experience associated with the new task; determining that the updated assistant profile meets an availability to complete the new task, and determining that the updated assistant profile meets a minimum historical user satisfaction and a minimum performance threshold.

Clause 3: The method of any one of Clauses 1-2, wherein matching the updated assistant profile with the new target user profile comprises generating, using a machine learning model, a recommendation to match the updated assistant profile with a new target user profile, wherein the machine learning model is a supervised learning model selected from a group comprising a gradient boosting machine, a random forest, or a deep neural network, and is trained to predict a compatibility score between the updated assistant profile and candidate target user profiles based on features in the feature set associated with the assistant user, including assistant expertise, historical task types, user feedback ratings, task complexity, and prior matching outcomes.

Clause 4: The method of Clause 3, wherein generating, using the machine learning model, the recommendation to match the updated assistant profile with the new target user comprises generating a second prompt comprising a second set of instructions for the language model to: analyze information from the updated assistant profile and a plurality of candidate target user profiles; identify and extract a plurality of features from the updated assistant profile and the plurality of candidate target user profiles, wherein the plurality of features are relevant to matching the updated assistant profile to the new target user; structure the plurality of features into a format suitable for processing by the machine learning model; and provide the plurality of features to the machine learning model for generating a compatibility score or ranking for each candidate target user profile relative to the updated assistant profile.

Clause 5: The method of any one of Clauses 1-4, further comprising: determining a set of recency values related to how recent interaction data was received for each data point of interaction data; determining a set of weights associated with the interaction data and feedback for determining which interaction data and feedback will be relied on to match the updated assistant profile with the new target user profile; applying a higher weight to more recent interaction data and feedback and a lower weight to less recent interaction data and feedback based on the set of recency values, such that the language model is configured to match the updated assistant profile with the new target user profile based on higher weighted interaction data and feedback; and matching the updated assistant profile with the new target user profile based on the higher weighted interaction data and feedback.

Clause 6: The method of any one of Clauses 1-5, wherein matching the updated assistant profile with the new target user profile further comprises filtering out candidate target user profiles based on not meeting one or more jurisdictional requirements associated with the task.

Clause 7: The method of any one of Clauses 1-6, wherein the assistant profile includes a performance trend indicator based on aggregated feedback over a plurality of completed tasks, further comprising updating the performance trend indicator based on the feature set.

Clause 8: The method of any one of Clauses 1-7, wherein matching the updated assistant profile with the new target user profile associated with the new target user and the new task comprises: determining a complexity level of the new task; determining an experience level of the assistant user associated with the updated assistant profile; and matching the updated assistant profile with the new target user profile based on matching the complexity level of the new task to the experience level of the assistant user.

Clause 9: The method of any one of Clauses 1-8, further comprising: assigning the new task to a complexity category of a plurality of complexity categories; and matching the updated assistant profile with the new target user profile based on the experience level of the assistant user associated with the updated assistant profile corresponding to the complexity category into which the new task was sorted.

Clause 10: The method of any one of Clauses 1-9, further comprising: receiving task data associated with the new task from the new target user; determining a complexity level of the new task; generating a recommendation for the new target user to use a particular assistant user of a plurality of assistant users for completing the new task; and receiving user input confirming the recommendation for the new target user to use the particular assistant user for completing the new task, wherein matching the updated assistant profile with the new target user profile associated with the new target user and the new task is based on receiving the user input confirming the recommendation.

Clause 11: A processing system, comprising: memory comprising computer-executable instructions; and one or more processors configured to execute the computer-executable instructions and cause the processing system to perform a method in accordance with any one of Clauses 1-10.

Clause 12: A processing system, comprising means for performing a method in accordance with any one of Clauses 1-10.

Clause 13: A non-transitory computer-readable medium storing program code for causing a processing system to perform the steps of any one of Clauses 1-10.

Clause 14: A computer program product embodied on a computer-readable storage medium comprising code for performing a method in accordance with any one of Clauses 1-10.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database, or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system, comprising: one or more memories comprising computer-executable instructions; and one or more processors configured to execute the computer-executable instructions and cause the processing system to:

receive, from an assistant user, a first user input comprising one or more assistant attributes;

generate an assistant profile based on the one or more assistant attributes;

match the assistant profile to a target user profile and a task associated with the target user profile;

receive interaction data between the assistant user and a target user corresponding to the target user profile while the assistant user completes the task;

receive, from the target user, a second user input comprising feedback about the assistant user completing the task;

generate a prompt comprising a set of instructions for a language model to generate a feature set associated with the assistant user based on the one or more assistant attributes, the interaction data, and the feedback;

provide the prompt, the first user input, the interaction data, and the second user input to the language model;

receive the feature set associated with the assistant user from the language model;

generate an updated assistant profile by modifying the assistant profile based on the feature set; and match the updated assistant profile with a new target user profile associated with a new target user and a new task.

2. The processing system of claim 1, wherein;

to cause the processing system to match the updated assistant profile with the new target user profile, the one or more processors are configured to cause the processing system to match the updated assistant profile with the new target user profile based on rule-based entity matching, and to cause the processing system to match the updated assistant profile with the new target user profile based on the rule-based entity matching, the one or more processors are configured to cause the processing system to:

apply one or more predefined rules to compare features of the updated assistant profile and the new target user profile, the one or more predefined rules including at least one of: matching required jurisdiction or matching required certification;

determine that the updated assistant profile meets a minimum number of years of experience requirement associated with the new task;

determine that the updated assistant profile meets an availability requirement to complete the new task; and determine that the updated assistant profile meets a minimum historical user satisfaction score and a minimum performance threshold.

3. The processing system of claim 1, wherein to cause the processing system to match the updated assistant profile with the new target user profile, the one or more processors are configured to cause the processing system to generate, using a machine learning model, a recommendation to match the updated assistant profile with the new target user profile, wherein the machine learning model is a supervised learning model selected from a group comprising a gradient boosting machine, a random forest, or a deep neural network, and is trained to predict a compatibility score between the updated assistant profile and a candidate target user profile based on features in the feature set associated with the assistant user, the features in the feature set including assistant expertise, historical task types, user feedback ratings, task complexity, and prior matching outcomes.

4. The processing system of claim 3, wherein to cause the processing system to generate, using the machine learning model, the recommendation to match the updated assistant profile with the new target user profile, the one or more processors are configured to cause the processing system to generate a second prompt comprising a second set of instructions for the language model to:

analyze information from the updated assistant profile and the candidate target user profile;

identify and extract a plurality of features from the updated assistant profile and the candidate target user profile, wherein the plurality of features are relevant to matching the updated assistant profile to the new target user profile;

structure the plurality of features into a format suitable for processing by the machine learning model; and provide the plurality of features to the machine learning model for generating a compatibility score or a ranking for the candidate target user profile relative to the updated assistant profile.

5. The processing system of claim 1, wherein the one or more processors are further configured to execute the computer-executable instructions and cause the processing system to:

determine a set of recency values related to how recently a set of corresponding data points of the interaction data were received;

determine a set of weights associated with each data point of the interaction data and the feedback for determining which data point of the interaction data and the feedback will be relied on to match the updated assistant profile with the new target user profile;

apply a first weight to a first data point of the interaction data and the feedback and a second weight to a second data point of the interaction data and the feedback based on the set of recency values, such that the language model is configured to match the updated assistant profile with the new target user profile based on the first data point of the interaction data and the feedback, wherein the first weight is higher than the second weight and the first data point is more recent than the second data point; and match the updated assistant profile with the new target user profile based on the first data point of the interaction data and the feedback.

6. The processing system of claim 1, wherein to cause the processing system to match the updated assistant profile with the new target user profile, the one or more processors are configured to cause the processing system to filter out candidate target user profiles based on not meeting one or more jurisdictional requirements associated with the task.

7. The processing system of claim 1, wherein:

the assistant profile includes a performance trend indicator based on aggregated feedback over a plurality of completed tasks, and the one or more processors are further configured to execute the computer-executable instructions and cause the processing system to update the performance trend indicator based on the feature set.

8. The processing system of claim 1, wherein to cause the processing system to match the updated assistant profile with the new target user profile associated with the new target user and the new task, the one or more processors are configured to cause the processing system to:

determine a complexity level of the new task;

determine an experience level of the assistant user associated with the updated assistant profile; and match the updated assistant profile with the new target user profile based on matching the complexity level of the new task to the experience level of the assistant user.

9. The processing system of claim 1, wherein the one or more processors are further configured to execute the computer-executable instructions and cause the processing system to:

assign the new task to a complexity category of a plurality of complexity categories; and match the updated assistant profile with the new target user profile based on an experience level of the assistant user associated with the updated assistant profile corresponding to the complexity category to which the new task was assigned.

10. The processing system of claim 1, wherein the one or more processors are further configured to execute the computer-executable instructions and cause the processing system to:

receive, from the new target user, task data associated with the new task;

determine a complexity level of the new task;

generate a recommendation for the new target user to use a particular assistant user of a plurality of assistant users for completing the new task; and receive a third user input confirming the recommendation for the new target user to use the particular assistant user for completing the new task, wherein to cause the processing system to match the updated assistant profile with the new target user profile associated with the new target user and the new task, the one or more processors are configured to cause the processing system to match the updated assistant profile with the new target user profile based on receiving the third user input confirming the recommendation.

11. A method, comprising:

receiving, from an assistant user, a first user input comprising one or more assistant attributes;

generating an assistant profile based on the one or more assistant attributes;

matching the assistant profile to a target user profile and a task associated with the target user profile;

receiving interaction data between the assistant user and a target user corresponding to the target user profile while the assistant user completes the task;

receiving, from the target user, a second user input comprising feedback about the assistant user completing the task;

generating a prompt comprising a set of instructions for a language model to generate a feature set associated with the assistant user based on the one or more assistant attributes, the interaction data, and the feedback;

providing the prompt, the first user input, the interaction data, and the second user input to the language model;

receiving the feature set associated with the assistant user from the language model;

generating an updated assistant profile by modifying the assistant profile based on the feature set; and matching the updated assistant profile with a new target user profile associated with a new target user and a new task.

12. The method of claim 11, wherein matching the updated assistant profile with the new target user profile is based on rule-based entity matching comprising:

applying one or more predefined rules to compare features of the updated assistant profile and the new target user profile, the one or more predefined rules including at least one of: matching required jurisdiction or matching required certification;

determining that the updated assistant profile meets a minimum number of years of experience requirement associated with the new task;

determining that the updated assistant profile meets an availability requirement to complete the new task; and determining that the updated assistant profile meets a minimum historical user satisfaction score and a minimum performance threshold.

13. The method of claim 11, wherein matching the updated assistant profile with the new target user profile comprises generating, using a machine learning model, a recommendation to match the updated assistant profile with the new target user profile, wherein the machine learning model is a supervised learning model selected from a group comprising a gradient boosting machine, a random forest, or a deep neural network, and is trained to predict a compatibility score between the updated assistant profile and a candidate target user profile based on features in the feature set associated with the assistant user, the features in the feature set including assistant expertise, historical task types, user feedback ratings, task complexity, and prior matching outcomes.

14. The method of claim 13, wherein generating, using the machine learning model, the recommendation to match the updated assistant profile with the new target user profile comprises generating a second prompt comprising a second set of instructions for the language model to:

analyze information from the updated assistant profile and the candidate target user profile;

identify and extract a plurality of features from the updated assistant profile and the candidate target user profile, wherein the plurality of features are relevant to matching the updated assistant profile to the new target user profile;

structure the plurality of features into a format suitable for processing by the machine learning model; and provide the plurality of features to the machine learning model for generating a compatibility score or a ranking for the candidate target user profile relative to the updated assistant profile.

15. The method of claim 11, further comprising:

determining a set of recency values related to how recently a set of corresponding data points of the interaction data were received;

determining a set of weights associated with a set of respective data points of the interaction data and the feedback for determining which data point of the interaction data and the feedback will be relied on to match the updated assistant profile with the new target user profile;

applying a first weight to a first data point of the interaction data and the feedback and a second weight to a second data point of the interaction data and the feedback based on the set of recency values, such that the language model is configured to match the updated assistant profile with the new target user profile based on the first data point of the interaction data and the feedback, wherein the first weight is higher than the second weight and the first data point is more recent than the second data point; and matching the updated assistant profile with the new target user profile based on the first data point of the interaction data and the feedback.

16. The method of claim 11, wherein matching the updated assistant profile with the new target user profile further comprises filtering out candidate target user profiles based on not meeting one or more jurisdictional requirements associated with the task.

17. The method of claim 11, wherein:

the assistant profile includes a performance trend indicator based on aggregated feedback over a plurality of completed tasks, and the method further comprises updating the performance trend indicator based on the feature set.

18. The method of claim 11, wherein matching the updated assistant profile with the new target user profile associated with the new target user and the new task comprises:

determining a complexity level of the new task;

determining an experience level of the assistant user associated with the updated assistant profile; and matching the updated assistant profile with the new target user profile based on matching the complexity level of the new task to the experience level of the assistant user.

19. The method of claim 11, further comprising:

assigning the new task to a complexity category of a plurality of complexity categories; and matching the updated assistant profile with the new target user profile based on an experience level of the assistant user associated with the updated assistant profile corresponding to the complexity category to which the new task was assigned.

20. The method of claim 11, further comprising:

receiving, from the new target user, task data associated with the new task;

determining a complexity level of the new task;

generating a recommendation for the new target user to use a particular assistant user of a plurality of assistant users for completing the new task; and receiving a third user input confirming the recommendation for the new target user to use the particular assistant user for completing the new task, wherein matching the updated assistant profile with the new target user profile associated with the new target user and the new task is based on receiving the third user input confirming the recommendation.

* * * * *